(12) United States Patent
Lee et al.

(10) Patent No.: US 8,553,010 B2
(45) Date of Patent: Oct. 8, 2013

(54) DISPLAY PANEL AND METHOD OF MANUFACTURING THE SAME

(75) Inventors: Sang-Hun Lee, Suwon-si (KR);
Byoung-Joo Kim, Anyang-si (KR);
Chul Huh, Yongin-si (KR); Gwan-Soo Kim, Seoul (KR); Sun-Young Chang, Bucheon-si (KR)

(73) Assignee: Samsung Display Co., Ltd. (KR)

( * ) Notice: Subject to any disclaimer, the term of this patent is extended or adjusted under 35 U.S.C. 154(b) by 975 days.

(21) Appl. No.: 12/404,246

(22) Filed: Mar. 13, 2009

(65) Prior Publication Data
US 2009/0231304 A1   Sep. 17, 2009

(30) Foreign Application Priority Data

Mar. 17, 2008 (KR) .................. 10-2008-0024467

(51) Int. Cl.
*G06F 3/045* (2006.01)
(52) U.S. Cl.
USPC ........................................................ 345/174
(58) Field of Classification Search
None
See application file for complete search history.

(56) References Cited

U.S. PATENT DOCUMENTS

| | | | | |
|---|---|---|---|---|
| 2008/0013023 | A1* | 1/2008 | Ochiai et al. | 349/114 |
| 2008/0018613 | A1* | 1/2008 | Kim et al. | 345/173 |
| 2008/0129898 | A1* | 6/2008 | Moon | 349/12 |
| 2008/0158199 | A1* | 7/2008 | Lee et al. | 345/174 |
| 2008/0180400 | A1* | 7/2008 | Kim et al. | 345/173 |
| 2008/0180407 | A1* | 7/2008 | Utsunomiya et al. | 345/174 |
| 2010/0214260 | A1* | 8/2010 | Tanaka et al. | 345/174 |

FOREIGN PATENT DOCUMENTS

CN         1975517 A      6/2007

* cited by examiner

*Primary Examiner* — Joseph Haley
*Assistant Examiner* — Emily Frank
(74) *Attorney, Agent, or Firm* — Innovation Counsel LLP

(57) ABSTRACT

Provided are a touch screen-embedded liquid crystal display panel and a method of manufacturing the same in accordance with one or more embodiments. The touch screen-embedded liquid crystal display panel may include, for example, a transparent first substrate; a second substrate which faces the first substrate; a conductive spacer and a cell-gap spacer which are formed on the first substrate; and a common electrode which is formed on the second substrate and has an aperture in a region that contacts the cell-gap spacer on the first substrate.

11 Claims, 18 Drawing Sheets

DISPLAY PANEL AND METHOD OF MANUFACTURING THE SAME

CROSS-REFERENCE TO RELATED APPLICATION

This application claims priority to and the benefit of Korean Patent Application No. 10-2008-0024467 filed on Mar. 17, 2008 in the Korean Intellectual Property Office, the disclosure of which is incorporated herein by reference in its entirety.

BACKGROUND

1. Technical Field

One or more embodiments of the present invention generally relate to a liquid crystal panel and a method of manufacturing the same. More particularly, one or more embodiments of the present invention relate to a touch screen-embedded liquid crystal display panel, in which a cell-gap spacer and a conductive spacer are formed on the same layer, and a method of manufacturing the liquid crystal display panel.

2. Description of the Related Art

Touch screens are a new type of input mechanism that can replace a mouse and keyboard. Information can be directly input to a touch screen by using a hand or a pen. In addition, a touch screen is easy to manipulate and allows a user to perform a desired task while viewing the touch screen. Therefore, touch screens are considered as the most ideal input mechanism in a graphical user interface (GUI) environment. Currently, touch screens are used extensively in mobile phones, personal digital assistants (PDAs), terminals used in banks, government and public offices, various medical equipments, information boards installed in tourism and other major institutions, and the like.

Of the various products that use touch screens, liquid crystal displays (LCDs) generally have touch screens installed outside thereof. Thus, an external touch screen must be attached onto a completed liquid crystal display panel in a separate process, complicating the manufacturing process and increasing the thickness of an LCD. To address these problems, built-in touch screen panels are being developed for flat panel displays, such as LCDs, which are increasingly required to be lighter, smaller, and thinner.

Built-in touch screens are classified into optical touch screens, ultrasonic touch screens, electrostatic capacity-type touch screens, and resistance film-type touch screens according to their purpose of use. In order to manufacture a built-in touch screen which uses a conductive spacer as a sensing device, a process of forming a cell-gap spacer, which maintains a cell gap for the sensing device, and a process of forming a conductive spacer on a different layer from that of the cell-gap spacer are required. However, if the cell-gap spacer and the conductive spacer are formed on different layers in the two processes as described above, the number of manufacturing processes is increased, thereby increasing manufacturing costs.

SUMMARY

One or more embodiments of the present invention provide a touch screen-embedded liquid crystal display panel including a cell-gap spacer and a conductive spacer, which are simultaneously formed on the same layer to reduce the number of manufacturing processes and manufacturing costs, a liquid crystal display (LCD) including the touch-screen embedded liquid crystal panel, and a manufacturing method thereof.

According to an exemplary embodiment of the present invention, a display panel includes a transparent first substrate; a second substrate which faces the first substrate; a conductive spacer and a cell-gap spacer which are formed on the first substrate; and a common electrode which is formed on the second substrate and has an aperture in a region that contacts the cell-gap spacer.

In accordance with another embodiment of the present invention, the conductive spacer and the cell-gap spacer may be formed on the same layer.

In accordance with another embodiment of the present invention, the first substrate may include a first structure on which the conductive spacer and the cell-gap spacer are formed.

In accordance with another embodiment of the present invention, the second substrate may include a second structure on which the common electrode is formed.

In accordance with another embodiment of the present invention, the first structure may include a thin-film transistor (TFT), first and second sensing lines, and an insulating film which is formed on the TFT and the first and second sensing lines.

In accordance with another embodiment of the present invention, a sensing electrode may be formed on the conductive spacer and may be connected to the first and second sensing lines by contact holes which are formed in the insulating film.

In accordance with another embodiment of the present invention, the second structure may include a black matrix, color filters formed on the black matrix, and the common electrode formed on the color filters.

In accordance with another embodiment of the present invention, the first structure may include a TFT, first and second sensing lines, and color filters which are formed on the TFT and the first and second sensing lines.

In accordance with another embodiment of the present invention, a sensing electrode may be formed on the conductive spacer and may be connected to the first and second sensing lines by contact holes which are formed in the color filters.

In accordance with another embodiment of the present invention, the color filters may include a red filter, a green filter, and a blue filter which have different thicknesses.

In accordance with another embodiment of the present invention, the cell-gap spacer may be formed on a thickest color filter from among the color filters, and the conductive spacer may be formed on a color filter of a different color than the color filter on which the cell-gap spacer is formed.

According to another exemplary embodiment of the present invention, a method of manufacturing a display panel includes forming a first structure, which includes first and second sensing lines, on a first substrate; forming a cell-gap spacer and a conductive spacer on the first structure; connecting the conductive spacer to the first and second sensing lines; forming a second structure, which includes a common electrode, on a second substrate; forming a pattern on the common electrode; and adhering the first substrate to the second substrate.

In accordance with another embodiment of the present invention, the forming of the first structure may include forming a first sensing line, which extends in a direction, and a gate line, which includes a gate electrode, on the first substrate; sequentially forming a gate insulating film, an active layer and an ohmic contact layer on the gate line and then forming an active region of a TFT; forming a second sensing line, which crosses the gate line, and a data line which includes a source electrode and a drain electrode; and forming an insulating film on the TFT, the gate line, the data line, and the first and second sensing lines.

In accordance with another embodiment of the present invention, the connecting of the conductive spacer to the first and second sensing lines may include forming contact holes in the insulating film to partially expose the first and second sensing lines; and forming a sensing electrode on the conductive spacer and the exposed first and second sensing lines.

In accordance with another embodiment of the present invention, the forming of the second structure may include forming a black matrix on the second substrate; and forming color filters on the second substrate.

In accordance with another embodiment of the present invention, the forming of the second structure may include forming a conductive layer on the color filters; and etching a region of the conductive layer, which corresponds to a region in which the cell-gap spacer is formed, and thus forming the common electrode.

In accordance with another embodiment of the present invention, the forming of the first structure may include forming a first sensing line, which extends in a direction, and a gate line, which includes a gate electrode, on the first substrate; sequentially forming a gate insulating film, an active layer and an ohmic contact layer on the gate line and then forming an active region of a TFT; forming a second sensing line, which crosses the gate line, and a data line which includes a source electrode and a drain electrode; and forming color filters on the TFT, the gate line, the data line, and the first and second sensing lines.

In accordance with another embodiment of the present invention, the forming of the color filters may include forming a red filter, a green filter and a blue filter, which have different thicknesses, on the TFT, the gate line, the data line, and the first and second sensing lines.

In accordance with another embodiment of the present invention, the forming of the cell-gap spacer and the conductive spacer on the first structure may include forming the cell-gap spacer on a thickest color filter from among the color filters; and forming the conductive spacer on a color filter of a different color than the color filter on which the cell-gap spacer is formed.

In accordance with another embodiment of the present invention, the forming of the second structure may include forming a conductive layer on the second substrate; and etching a region of the conductive layer, which corresponds to a region in which the cell-gap spacer is formed, and thus forming the common electrode.

BRIEF DESCRIPTION OF THE DRAWINGS

The above and other embodiments of the present invention will become more apparent by describing in detail exemplary embodiments thereof with reference to the attached drawings, in which.

DETAILED DESCRIPTION

Figure 1:
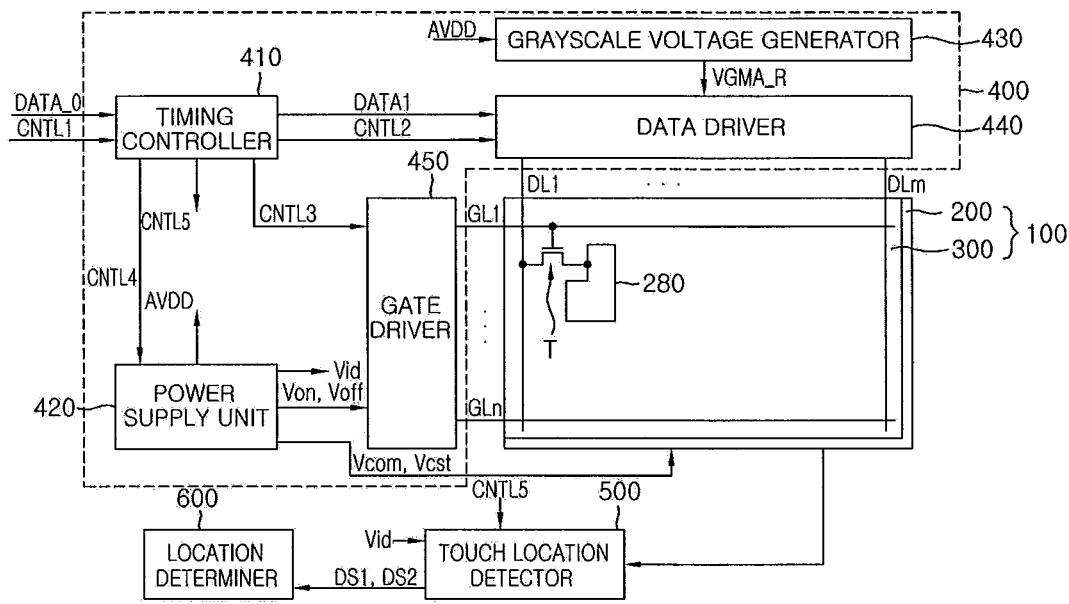
FIG. 1 is a schematic block diagram of a touch screen-embedded liquid crystal display (LCD) according to one or more exemplary embodiments of the present invention.

The embodiments of the present invention may be understood more readily by reference to the following detailed description and the accompanying drawings, in which one or more exemplary embodiments of the invention are shown. The present invention may, however, be embodied in many different forms and should not be construed as being limited to the embodiments set forth herein. Rather, these embodiments are provided so that this disclosure will be thorough and complete, and will fully convey the concept of embodiments of the invention to those skilled in the art. As such, the scope of the present invention will only be defined by the appended claims. In the drawings, sizes and relative sizes of layers and regions may be exaggerated for clarity.

It will be understood that when an element or layer is referred to as being "on" another element or layer, the element or layer may be directly on another element or layer, or intervening elements or layers may be present. In contrast, when an element is referred to as being "directly on" another element or layer, there are no intervening elements or layers present. Like reference numerals refer to like elements throughout. As used herein, the term "and/or" includes any and all combinations of one or more of the associated listed items.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

One or more embodiments will be described by referring to plan views and/or cross-sectional views representing idealized schematic views of the embodiment. Accordingly, the views may be modified depending on the manufacturing technologies used and/or tolerances desired. Therefore, it is understood that embodiments are not limited to those embodiments shown in the views, but may include modifications in configuration made on the basis of manufacturing processes. Additionally, regions and shapes thereof exemplified in the figures should not be construed to limit other embodiments of the invention.

FIG. 1 is a schematic block diagram of a touch screen-embedded liquid crystal display (LCD) according to one or more exemplary embodiments of the present invention. Referring to FIG. 1, the touch screen-embedded LCD may include a liquid crystal display panel 100, a panel driver 400, a touch location detector 500, and a location determiner 600.

The liquid crystal display panel 100 may include a lower substrate 200, an upper substrate 300, and a liquid crystal layer (not shown) interposed between the lower substrate 200 and the upper substrate 300. Thin-film transistors (TFTs), pixel electrodes, sensing electrodes, conductive spacers, and cell-gap spacers may be formed on the lower substrate 200. In addition, color filters, black matrices, and common electrodes may be formed on the upper substrate 300.

Specifically, a plurality of gate lines GL1 through GLn extending in one direction, and a plurality of data lines DL1 through DLm extending in the other direction, may be formed on the lower substrate 200. A pixel may be formed in a region at each intersection of the gate lines GL1 through GLn and the data lines DL1 through DLm. In addition, a switching device including a TFT T and a pixel electrode 280 may be formed in each pixel. The TFT T may be composed of a gate electrode, a source electrode, and a drain electrode. The gate electrode of the TFT T may be connected to one of the gate lines GL1 through GLn, the source electrode may be connected to one of the data lines DL1 through DLm, and the drain electrode may be connected to the pixel electrode 280.

To function as a touch screen panel, a plurality of first sensing lines (not shown) and a plurality of second sensing lines (not shown) may be formed on the lower substrate 200. In addition, sensing electrodes (not shown), which are connected to the first and second sensing lines, may be formed on the lower substrate 200. The first sensing line may extend in the same direction as the gate lines GL1 through GLn, and the second sensing line may extend in the same direction as the data lines DL1 through DLm. The first and second sensing lines may be electrically insulated from each other and may cross each other.

An initial driving voltage Vid having a predetermined potential may be applied to each of the first and second sensing lines, and the first and second sensing lines may be connected to the touch location detector 500. Each of the first and second sensing lines may be formed for each of red (R), green (G) and blue (B) pixels or may be formed for every predetermined number of pixels. For example, each of the first and second sensing lines may be formed for every three pixels.

To function as the touch screen panel, a plurality of conductive spacers (not shown) may be formed on the lower substrate 200. The conductive spacers may be connected to the sensing electrodes which may be connected to the first and second sensing lines. The conductive spacers may make electrical contact with common electrodes (not shown), which may be formed on the upper substrate 300, when external pressure is applied onto the liquid crystal display panel 100. A conductive spacer may be formed for each of the R, G and B pixels or may be formed for every predetermined number of pixels, such as every three pixels. In the present embodiment, each conductive spacer is connected to the first and second sensing lines by the sensing electrode as described above. Alternatively, each conductive spacer may be directly connected to the first and second sensing lines.

Color filters, common electrodes, and black matrices may be formed on the upper substrate 300. The upper substrate 300 may face the lower substrate 200 and may be coupled to the lower substrate 200 so that the liquid crystal layer (not shown) is interposed between the upper substrate 300 and the lower substrate 200. The upper substrate 300 may be a color filter substrate on which color filters for the corresponding pixels are formed. Alternatively, the color filters may also be formed on the lower substrate 200.

When the conductive spacers, which may be connected to the sensing electrodes formed on the lower substrate 200, electrically contact the common electrodes formed on the upper substrate 300 due to external pressure, the potential level of the initial driving voltage Vid applied to the first and second sensing lines may vary. Thus, x- and y-axis coordinates of a location to which the external pressure is applied may be determined by detecting for the variation in the potential level of the initial driving voltage Vid.

A panel driver 400 may include a timing controller 410, a power supply unit 420, a grayscale voltage generator 430, a data driver 440, and a gate driver 450.

The timing controller 410 controls the overall operation of the LCD. The timing controller 410 may receive R, G and B raw data signals DATA_0 and a first control signal CNTL1 from a host system, such as a graphic controller (not shown), and may output first data signals DATA1 and second through fourth control signals CNTL2 through CNTL4 to display an image on the liquid crystal display panel 100.

Specifically, the first control signal CNTL 1 may include a main clock signal MCLK, a horizontal synchronizing signal HSYNC, and a vertical synchronizing signal VSYNC. The second control signal CNTL2 may include a horizontal start signal STH, a reverse signal REV, and a data load signal TP to control the data driver 440. The third control signal CNTL3 may include a vertical start signal STV, a clock signal CK, and an output-enable signal OE to control the gate driver 450. The fourth control signal CNTL4 may include the clock signal CK of CNTL3 and the reverse signal REV of CNTL2 to control the power supply unit 420.

As mentioned, the timing controller 410 may provide the first data signals DATA1, which are used to control the output timings of the received R, G and B raw data signals DATA_0 to the data driver 440. Additionally, the timing controller 410 may also output a fifth control signal CNTL5 to control the touch location detector 500. The fifth control signal CNTL5 may include a clock signal to control the initial driving voltage Vid, which is output from the power supply unit 420, to be provided to the first and second sensing lines.

In response to the fourth control signal CNTL4 output from the timing controller 410, the power supply unit 420 may output common voltages Vcom and Vcst, which are provided to the liquid crystal display panel 100, the initial driving voltage Vid, which is provided to the lower substrate 200 for the touch screen function, an analog driving voltage AVDD, which is provided to the grayscale voltage generator 430, and gate-on and gate-off voltages Von and Voff, which are provided to the gate driver 450.

The grayscale voltage generator 430 may output a plurality of reference grayscale voltages VGMA_R that is equal in number to the number of grayscale levels by using the analog driving voltage AVDD, which is provided by the power supply unit 420, as a reference voltage. That is, the analog driving voltage AVDD may be divided into a plurality of reference grayscale voltages VGMA_R based on a resistance ratio to which a gamma curve is applied.

The data driver 440 may generate a grayscale voltage VGMA based on the reference grayscale voltages VGMA_R received from the grayscale voltage generator 430. In addition, the data driver 440 may convert the digital first data signals DATA1, which are provided in units of lines, into analog data signals based on the second control signal CNTL2 received from the timing controller 410 and the grayscale voltage VGMA, Furthermore, the data driver 440 may control output timings of the data signals, and may output the data signals to the data lines DL1 through DLm.

The gate driver 450 may generate gate signals in response to the third control signal CNTL3, which is output from the timing controller 410, and the gate-on and gate-off voltages Von and Voff, which are output from the power supply unit 420, and may sequentially output the generated gate signals to the gate lines GL1 through GLn.

The touch location detector 500 may detect coordinates of a location where external pressure has been applied. That is, when the conductive spacers formed on the lower substrate 200 makes contact with the common electrodes formed on the upper substrate 300 due to external pressure, the initial driving voltage Vid applied to the first and second sensing lines, which are electrically connected to the conductive spacers, may vary. Here, the touch location detector 500 may detect the variation in the initial driving voltage Vid and may determine x- and y-axis coordinates of the location where the external pressure has been applied. Therefore, the touch location detector 500 may include a power supply controller (not shown) and a data sampler (not shown). The power supply controller may provide the initial driving voltage Vid to the first and second sensing lines in response to the fifth control signal CNTL5. The data sampler may detect a variation in the initial driving voltage Vid applied to each of the first and second sensing lines and may output a first detection signal DS1 and a second detection signal DS2. The touch location detector 500 may also be formed in the data driver 440.

The location determiner 600 may combine x- and y-axis coordinates determined based on the first and second detection signals DS1 and DS2 received from the touch location detector 500, and may determine a location on the liquid crystal display panel 100 where external pressure has been applied.

Figure 2:
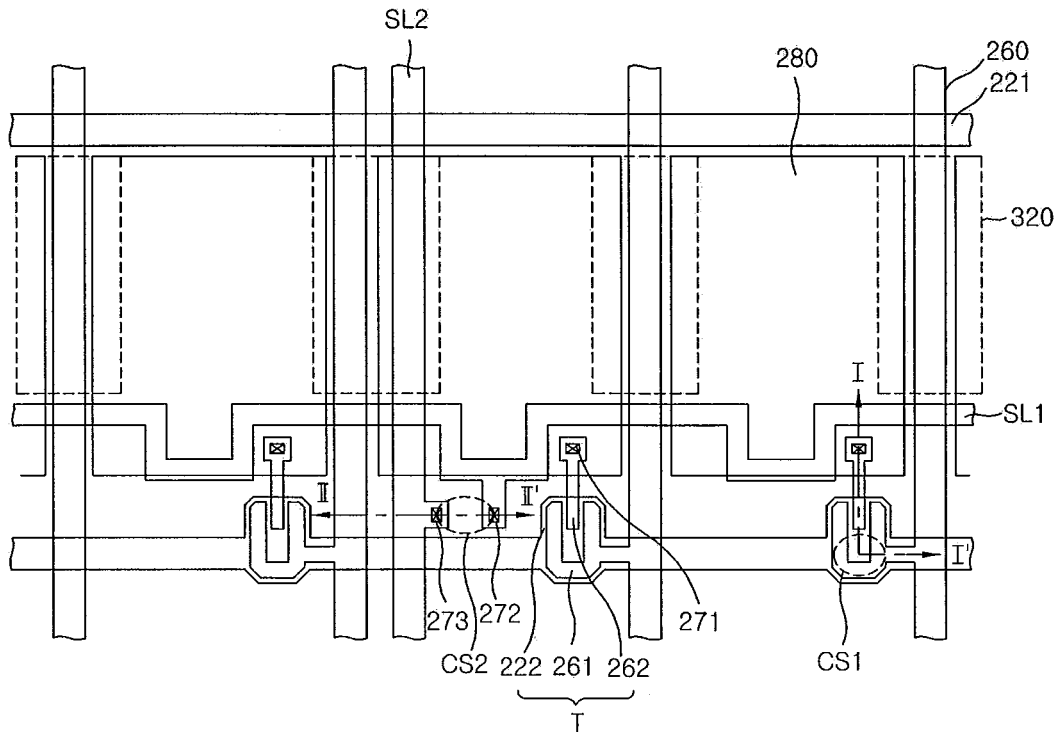
FIG. 2 is a schematic plan view of a touch screen-embedded liquid crystal display panel according to one or more exemplary embodiments of the present invention.
Figure 3:
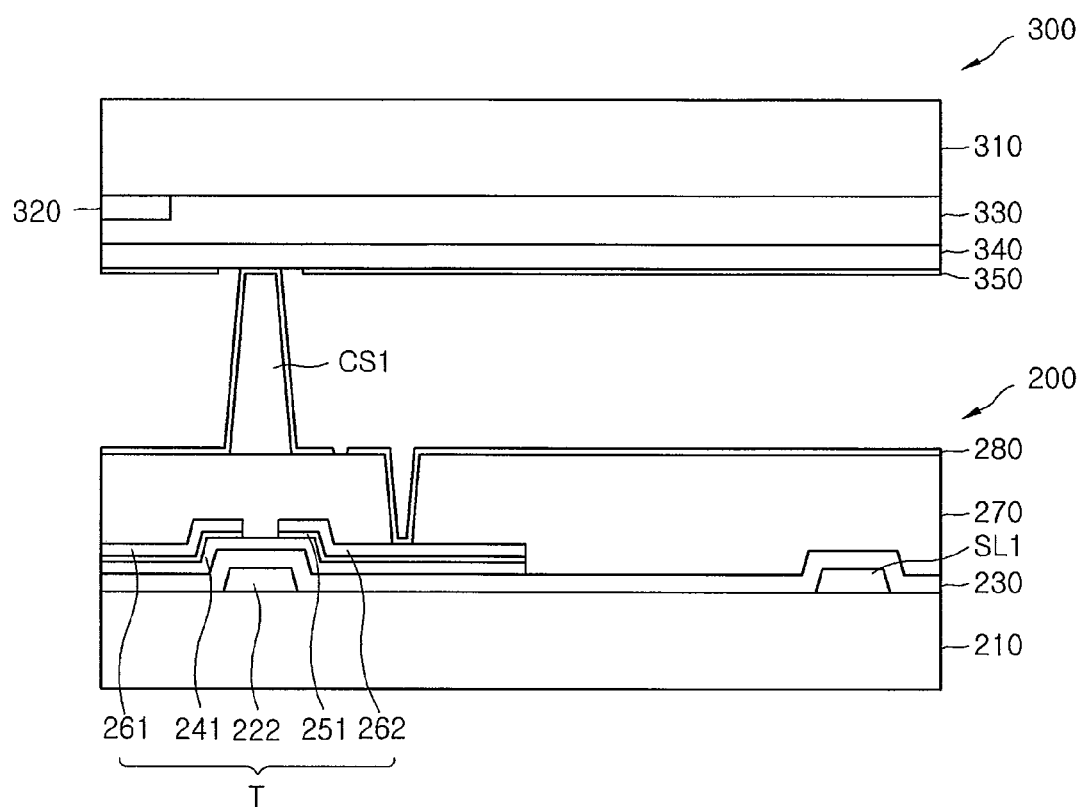
FIGS. 3 and 4 are cross-sectional views of the touch screen-embedded liquid crystal display panel taken along lines I-I' and II-II' of FIG. 2 according to one or more exemplary embodiments of the present invention.
Figure 4:
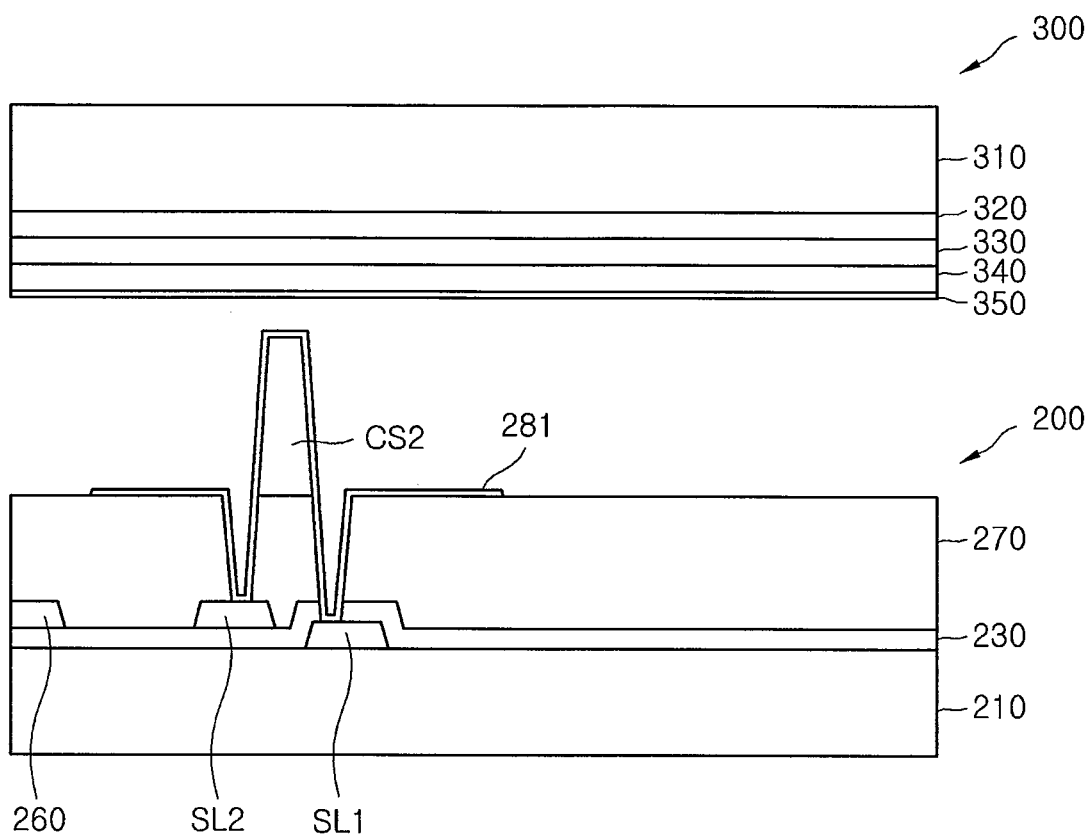

FIG. 2 is a schematic plan view of the touch screen-embedded liquid crystal display panel 100 according to one or more exemplary embodiments of the present invention. FIGS. 3 and 4 are cross-sectional views of the touch screen-embedded liquid crystal display panel 100 taken along lines I-I' and II-II', respectively, of FIG. 2. In the present embodiment, it will be assumed that a sensing electrode and a conductive spacer are formed for every three pixels.

Referring to FIGS. 2 through 4, the touch screen-embedded liquid crystal display panel 100 may include the lower substrate 200 and the upper substrate 300, which face each other, and a liquid crystal layer (not shown) which is interposed between the lower substrate 200 and the upper substrate 300.

The lower substrate 200 may include a plurality of gate lines 221, a plurality of data lines 260, a pixel electrode 280, and a TFT T on a first insulating substrate 210. The gate lines 221 may extend in a first direction, and the data lines 260 may extend in a second direction and may cross the gate lines 221. In addition, the pixel electrode 280 may be formed in a pixel region defined by the gate lines 221 and the data lines 260, and the TFT T may be connected to each of the gate lines 221, each of the data lines 260, and the pixel electrode 280. The lower substrate 200 may further include first and second sensing lines SL1 and SL2, a sensing electrode 281, a cell-gap spacer CS1, and a conductive spacer CS2. The first sensing line SL1 may be separated from and may extend in the same direction as each of the gate lines 221. Similarly, the second sensing line SL2 may be separated from and may extend in the same direction as each of the data lines 260. In addition, the sensing electrode 281 may be connected to the first and second sensing lines SL1 and SL2.

Specifically, the gate lines 221 may extend in, for example, a horizontal direction, and a portion of each of the gate lines 221 may protrude to form a gate electrode 222. A gate insulating film 230 may be formed on a whole surface of the first insulating substrate 210 having the gate lines 221. The gate insulating film 230 may be single layer or multiple layers and may be made of silicon oxide (SiOx) or silicon nitride (SiNx).

An active layer 241 may be made of a first semiconductor material such as amorphous silicon and formed on the gate insulating film 230. An ohmic contact layer 251 may be made of a second semiconductor material, such as silicide or n+ hydrogenated amorphous silicon doped with n-type impurities in high concentration, and formed on the active layer 241. A portion of the ohmic contact layer 251 in a channel region between a source electrode 261 and a drain electrode 262 may be removed.

The data lines 260 may be formed on the gate insulating film 230. The data lines 260 may extend in a vertical direction that intersects the gate lines 221. A region in which the data lines 260 and the gate lines 221 cross each other is defined as a pixel region. The source electrode 261 may protrude from each of the data lines 260 onto the ohmic contact layer 251. In addition, the drain electrode 262 may be separated from the source electrode 261 and formed on the ohmic contact layer 251.

A passivation layer 270 may be formed on a whole surface of the gate insulating film 230 having the gate lines 221 and the data lines 260. The passivation layer 270 may be an inorganic insulating layer or an organic insulating layer. In addition, first through third contact holes 271 through 273 may be formed in predetermined regions of the passivation layer 270. The first contact hole 271 may expose a predetermined region of the drain electrode 262; the second contact hole 272 may partially expose the first sensing line SL1; and the third contact hole 273 may partially expose the second sensing line SL2.

The pixel electrode 280 may be formed on the passivation layer 270. The pixel electrode 280 may be made of a transparent conductive material such as indium tin oxide (ITO) or indium zinc oxide (IZO). The pixel electrode 280 may be connected to the drain electrode 262 by the first contact hole 271.

The first sensing line SL1 may be separated from each of the gate lines 221 by a predetermined gap and may be formed at the same time as the gate lines 221. In addition, the second sensing line SL2 may be separated from each of the data lines 260 by a predetermined gap. The second sensing line SL2 may be formed for every predetermined number of pixels. For example, the second sensing line SL2 may be formed between a B pixel and an R pixel. In addition, the second sensing line SL2 may be formed at the same time as the data lines 260.

The sensing electrode 281 may be connected to the first and second sensing lines SL1 and SL2 by the second and third contact holes 272 and 273, respectively. The sensing electrode 281 may be formed at the same time as the pixel electrode 280 and may be separated from the pixel electrode 280 by a predetermined gap.

The cell-gap spacer CS1 is used to maintain a gap between the lower substrate 200 and the upper substrate 300 and may be formed for each pixel or every predetermined number of pixels. For example, the cell-gap spacer CS1 may be formed for every three pixels. The cell-gap spacer CS1 may be formed on the TFT T, in particular, in a region where a black matrix between a B filter and an R filter is formed.

The conductive spacer CS2 may be formed for every predetermined number of pixels. For example, the conductive spacer CS2 may be formed on first and second sensing electrodes of the lower substrate 200 to correspond to the black matrix between the R pixel and the B pixel from among the R, G and B pixels which are arranged sequentially. The location of the conductive spacer CS2 may be changed as long as the conductive spacer CS2 is not visible on the screen and a location on the screen, which is touched by a user, can be detected by the conductive spacer CS2 without difficulty.

The cell-gap spacer CS1 and the conductive spacer CS2, according to one or more embodiments of the present invention, may be formed on the same layer, that is, on the passivation layer 270 of the lower substrate 200, and may be separated from each other. A conductive layer, which is identical to the pixel electrode 280, may be formed on the cell-gap spacer CS1 and the conductive spacer CS2. The cell-gap spacer CS1 may contact the upper substrate 300 and thus may support the lower and upper substrates 200 and 300. On the other hand, the conductive spacer CS2 may contact the first and second sensing electrodes but may be separated from the upper substrate 300 by a predetermined gap. The conductive spacer CS2, which is separated from the upper substrate 300 by the predetermined gap, may contact a common electrode formed on the upper substrate 300 when a user touches the screen. Thus, a location on the screen touched by the user can be detected. In the present embodiment, the conductive spacer CS2 contacts the first and second sensing electrodes. However, embodiments of the present invention may not be limited thereto. For example, two conductive spacers may contact the first and second sensing electrodes separately.

The upper substrate 300 may include a black matrix 320, color filters 330, an overcoat layer 340, and a common electrode 350 on a second insulating substrate 310.

The black matrix 320 may be formed in regions of the upper substrate 300 other than a pixel region. For example, the black matrix 320 may be formed in regions of the upper substrate 300 corresponding to each of the gate lines 221, each of the data lines 260, the TFT T, and the first and second sensing lines SL1 and SL2 of the lower substrate 200. The black matrix 320 prevents leakage of light to regions other than a pixel region and also prevents optical interference between adjacent pixel regions. The black matrix 320 may be made of a photosensitive organic material which is added with a black pigment. The black pigment may be carbon black or titanium oxide.

R, G and B filters may be formed in a repetitive pattern between portions of the black matrix 320 to form the color filters 330. The color filters 330 add color to light radiated by a light source and passed through the liquid crystal layer (not shown). The color filters 330 may be made of a photosensitive organic material.

In the present embodiment, color filters and a black matrix are formed on an upper substrate. However, embodiments of the present invention may not be limited to the present embodiment. For example, the color filters and the black matrix may also be formed on the lower substrate, which will be described later in a subsequent embodiment.

The common electrode 350 may be made of a transparent conductive material such as ITO or IZO. The common electrode 350 may be formed on the second insulating substrate 310 having the black matrix 320 and the color filters 330. In the present embodiment, the common electrode 350 in a region, in which the cell-gap spacer CS1 is formed, may be etched in order to prevent the conductive layer formed on the cell-gap spacer CS1 of the lower substrate 200 from electrically contacting the common electrode 350 of the upper substrate 300. In this case, the common electrode 350 may be generally etched when a common electrode pattern is formed. Thus, no additional process is required.

As described above, the LCD according to the exemplary embodiment of the present invention has a cell-gap spacer CS1 and a conductive spacer CS2 formed on the same layer of a lower substrate 200. Thus, the number of processes required to manufacture the display panel can be reduced. In addition, a slit pattern may be formed in each common electrode 350 in order to partition liquid crystal molecules of each pixel into a plurality of domains so as to align the liquid crystal molecules accordingly. In this case, a portion of each common electrode 350 corresponding to a region where the cell-gap spacer CS1 is formed may be etched when the slit pattern is formed. Thus, the upper substrate 300 may be manufactured without requiring an additional process. Even if the slit pattern is not formed in each common electrode 350, the portion of the common electrode 350 corresponding to the region where the cell-gap spacer CS1 is formed may be etched. In this case, it may be simpler to etch the flat common electrode 350 than to remove the conductive layer formed on the cell-gap spacer CS1 of the lower substrate 200.

FIGS. 5A through 10B are cross-sectional views of a device for sequentially explaining processes included in a method of manufacturing the lower substrate 200 of the touch screen-embedded LCD according to one or more exemplary embodiments of the present invention. 'A' of each drawing is a process cross-sectional view of the lower substrate 200 taken along the line I-I' of FIG. 2, and 'B' of each drawing is a process cross-sectional view of the lower substrate 200 taken along the line II-II' of FIG. 2.

Figure 5A:
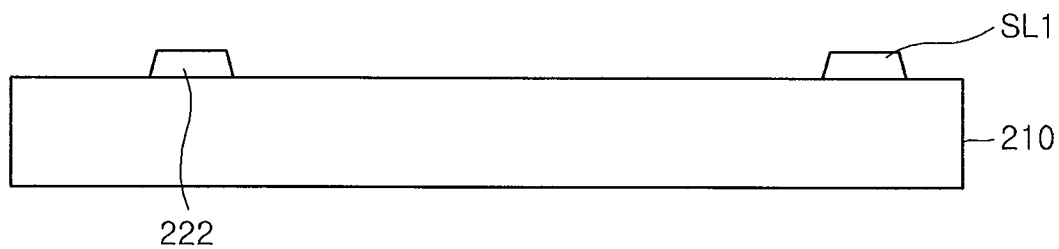
FIGS. 5A through 10B are cross-sectional views of a device for sequentially explaining processes included in a method of manufacturing a lower substrate of the touch screen-embedded LCD taken along lines I-I' and II-II' of FIG. 2 according to one or more exemplary embodiments of the present invention.
Figure 5B:
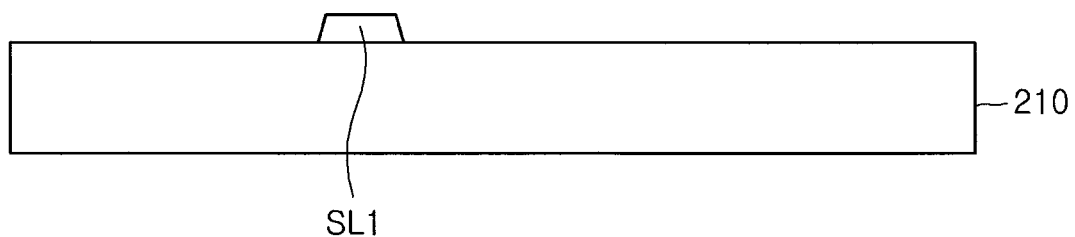

Referring to FIGS. 5A and 5B, in order to manufacture the touch screen-embedded LCD according to the exemplary embodiment of the present invention, a first conductive layer may be formed on a transparent insulating substrate, that is, the first insulating substrate 210, which may be made of glass, quartz, or plastic. Then, the first conductive layer may be patterned in a photolithography process by using a first mask. As a result, the gate lines 221, which may extend in one direction at regular intervals, and a gate electrode 222, which may protrude from each of the gate lines 221, may be formed. In addition, the first sensing line SL1, which may be separated from each of the gate lines 221 by a predetermined gap, may be formed.

Figure 6A:
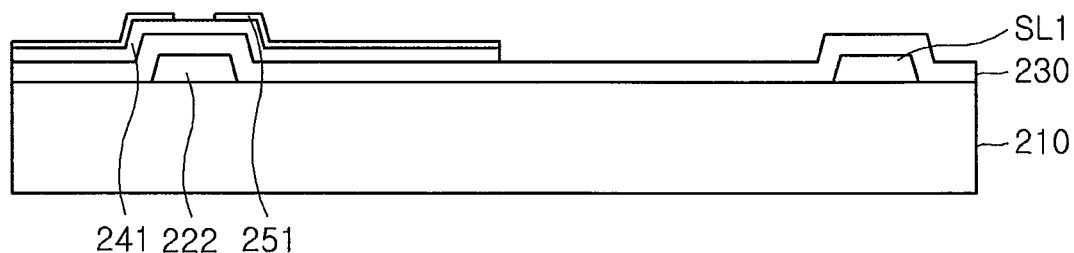
Figure 6B:
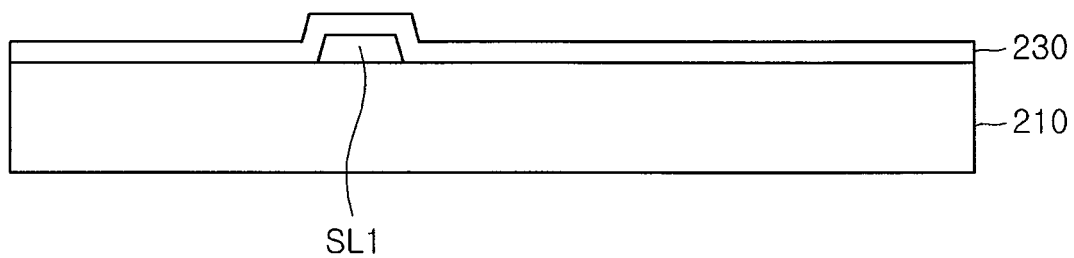

Referring to FIGS. 6A and 6B, the gate insulating film 230 and first and second semiconductor layers may be sequentially formed on the whole surface of the first insulating substrate 210. Then, the second and first semiconductor layers may be patterned in a photolithography process by using a second mask. As a result, the active layer 241 and the ohmic contact layer 251 may be formed. The active layer 241 and the ohmic contact layer 251 may be formed to cover the gate electrode 222. The gate insulating film 230 may be made of an inorganic insulating material that contains SiOx or SiNx. In addition, the first semiconductor layer may be an amorphous silicon layer, and the second semiconductor layer may be made of silicide or n+ hydrogenated amorphous silicon doped with n-type impurities in high concentration.

Figure 7A:
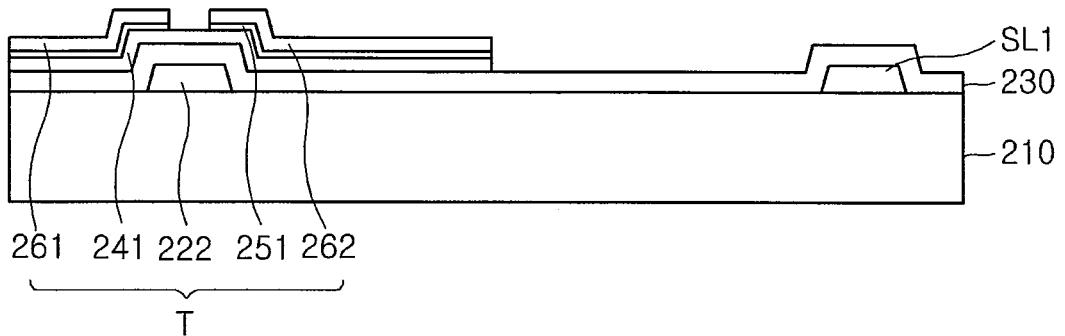
Figure 7B:
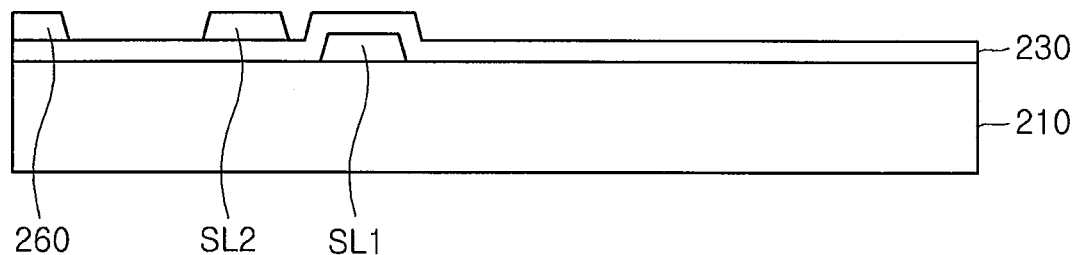

Referring to FIGS. 7A and 7B, a second conductive layer may be formed on the whole surface of the first insulating substrate 210. Then, the second conductive layer may be patterned in a photolithography process by using a third mask. As a result, the data lines 260, each including the source electrode 261 protruding from the data line 260 and the drain electrode 262, may be formed to extend in a direction orthogonal to the gate lines 221. At the same time, the second sensing line SL2, which may be separated from each of the data lines 260 by a predetermined gap, may be formed. The second sensing line SL2 may be formed for every group of one or more pixels, such as for every three pixels.

Figure 8A:
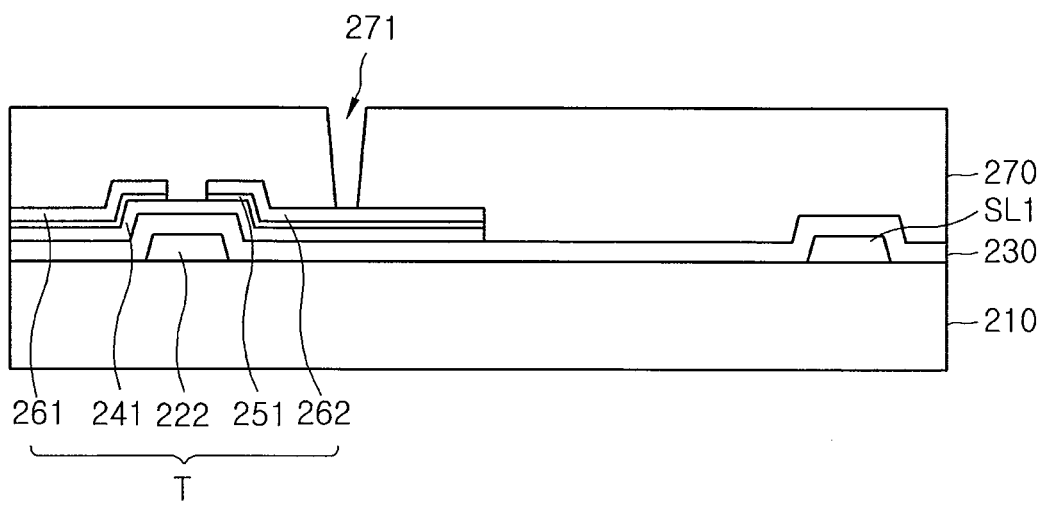
Figure 8B:
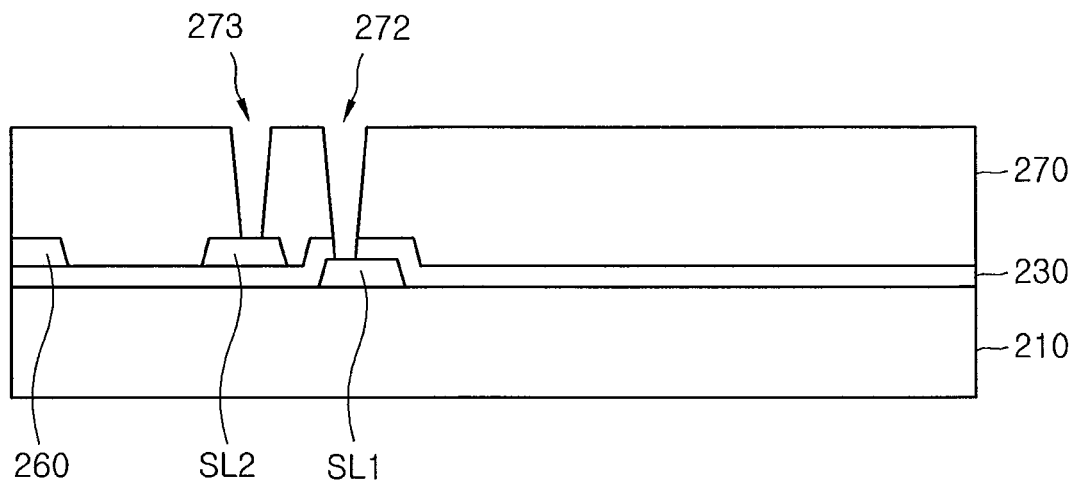

Referring to FIGS. 8A and 8B, the passivation layer 270 may be formed on the whole surface of the first insulating substrate 210. Then, the passivation layer 270 may be partially etched in a photolithography process by using a fourth mask. As a result, the first contact hole 271, which may expose the drain electrode 262, the second contact hole 272, which may expose the first sensing line SL1, and the third contact hole 273, which may expose the second sensing line SL2, may be formed.

Figure 9A:
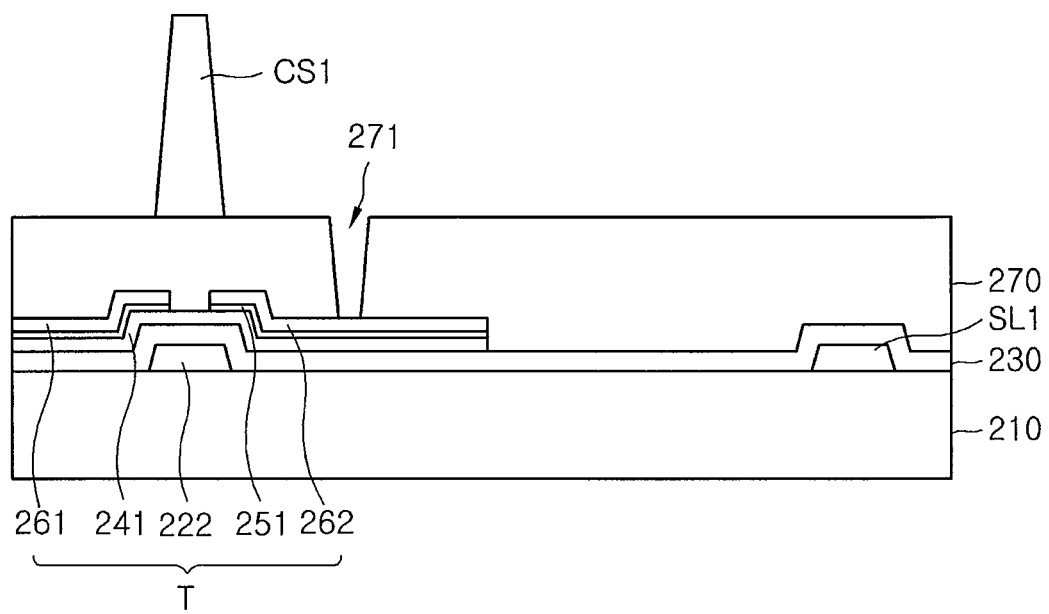
Figure 9B:
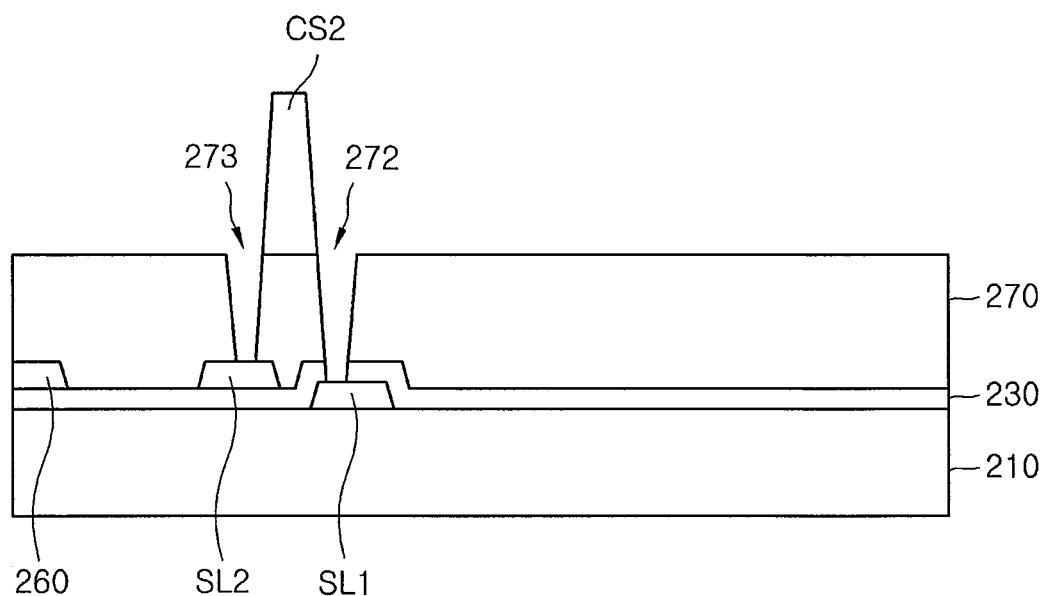

Referring to FIGS. 9A and 9B, a third conductive layer may be formed on the passivation layer 270. Then, the third conductive layer may be patterned in a photolithography process by using a fifth mask. As a result, the cell-gap spacer CS1 and the conductive spacer CS2 may be formed. Here, the cell-gap spacer CS1 and the conductive spacer CS2 may be formed to have different heights. That is, the cell-gap spacer CS1 may be higher than the conductive spacer CS2. In this case, when the screen is not touched by a user, the cell-gap spacer CS1 may contact the upper substrate 300, and the conductive spacer CS2 may be separated from the upper substrate 300 by a predetermined gap. In the present embodiment, the third conductive layer is used to form the cell-gap spacer CS1 and the conductive spacer CS2. However, an insulating material may also be used to form the cell-gap spacer CS1 and the conductive spacer CS2.

Figure 10A:
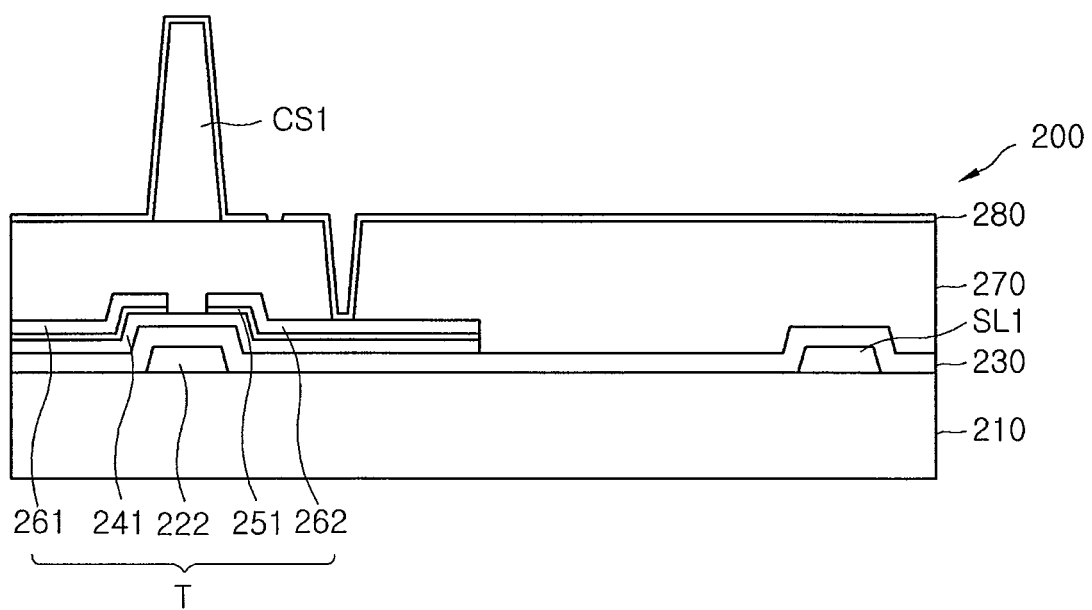
Figure 10B:
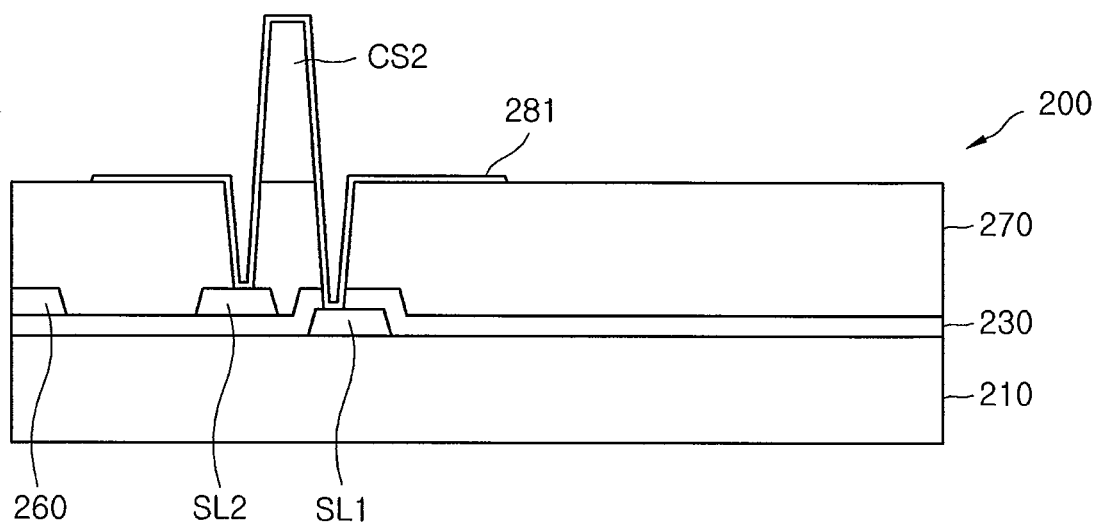

Referring to FIGS. 10A and 10B, a fourth conductive layer may be formed on the whole surface of the first insulating substrate 210. Then, the fourth conductive layer may be patterned in a photolithography process by using a sixth mask. As a result, the pixel electrode 280 and the sensing electrode 281 may be formed. The pixel electrode 280 may be formed in a pixel region in which the gate lines 221 and the data lines 260 cross each other. The pixel electrode 280 may be connected to the drain electrode 262 by the first contact hole 271. In addition, the sensing electrode 281 may be electrically connected to the first and second sensing lines SL1 and SL2 by the second and third contact holes 272 and 273, respectively. Since the sensing electrode 281 may be formed in a region other than the pixel region, it may not be electrically connected to the pixel electrode 280. The fourth conductive layer may be a transparent conductive layer made of ITO or IZO.

FIGS. 11A through 13B are cross-sectional views of a device for sequentially explaining processes included in a method of manufacturing the upper substrate 300 of the touch screen-embedded LCD according to one or more exemplary embodiments of the present invention. 'A' of each drawing is a process cross-sectional view of the upper substrate 300 taken along the line I-I' of FIG. 2, and 'B' of each drawing is a process cross-sectional view of the upper substrate 300 taken along the line II-II' of FIG. 2.

Figure 11A:
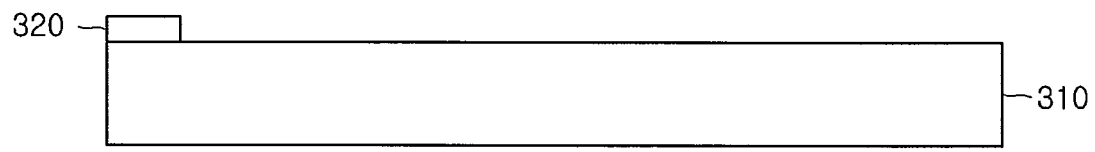
FIGS. 11A through 13B are cross-sectional views of a device for sequentially explaining processes included in a method of manufacturing an upper substrate of the touch screen-embedded LCD taken along lines I-I' and II-II' of FIG. 2 according to one or more exemplary embodiments of the present invention.
Figure 11B:
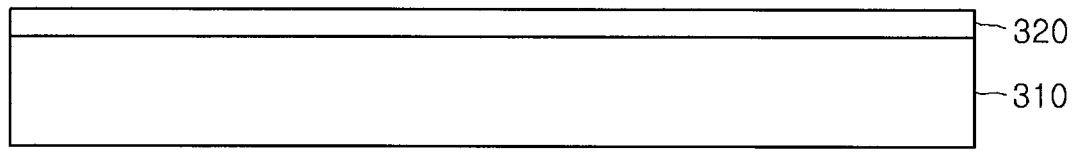

Referring to FIGS. 11A and 11B, the black matrix 320 may be formed in predetermined regions of a transparent insulating substrate, that is, the second insulating substrate 310, which may be made of glass, quartz, ceramic or plastic. Specifically, a photosensitive organic material added with a black pigment, such as carbon black or titanium oxide, may be formed on the second insulating substrate 310, and an exposure and development process may be performed on the photosensitive organic material by using a first mask. As a result, the black matrix 320 may be formed. The black matrix 320 may be formed in regions other than a pixel region, that is, in regions corresponding to each of the gate lines 221, each of the data lines 260, and the first and second sensing lines SL1 and SL2 of the lower substrate 200. The black matrix 320 partitions the color filters 330 and blocks light passing through liquid crystal cells in regions which cannot be controlled by the pixel electrode 280 of the lower substrate 200, thereby improving contrast ratio of the LCD.

Figure 12A:
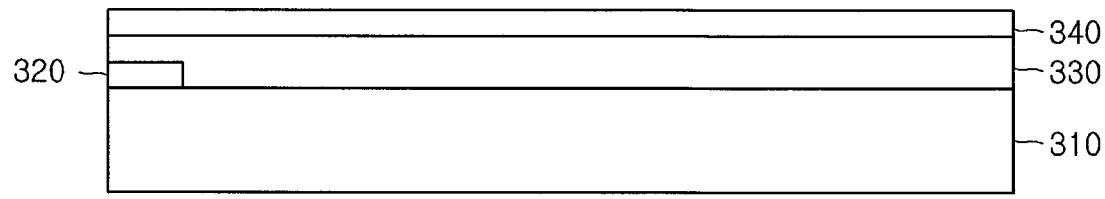
Figure 12B:
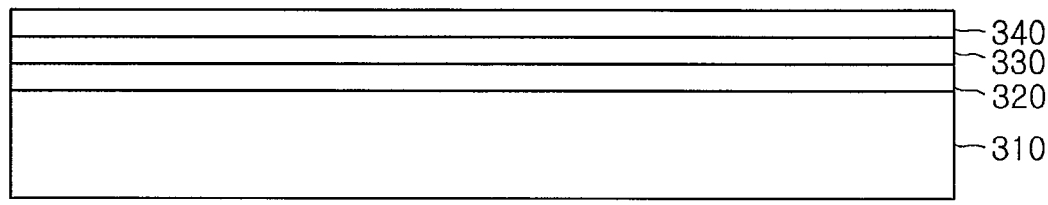

Referring to FIGS. 12A and 12B, the color filters 330, which include, e.g., the R, G and B filters, may be formed on the second insulating substrate 310 having the black matrix 320. Specifically, a negative color resist having an R pigment dispersed therein may be coated on the second insulating substrate 310. Then, the negative color resist in a region where the R filter is to be formed may be exposed by using a second mask. Next, the negative color resist may be developed using a developing solution. Accordingly, the exposed region is not removed, but may remain as a pattern while a region that is not exposed may be removed. As a result, the R filter may be formed on the second insulating substrate 310. The B filter and the G filter may also be formed as described above. In order to obtain superior step coverage, an overcoat layer 340 may be formed on the color filters 330 when the common electrode 350 is formed.

Figure 13A:
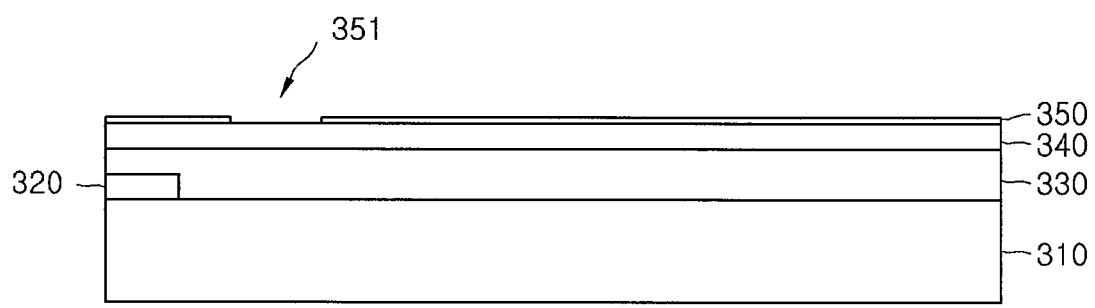
Figure 13B:
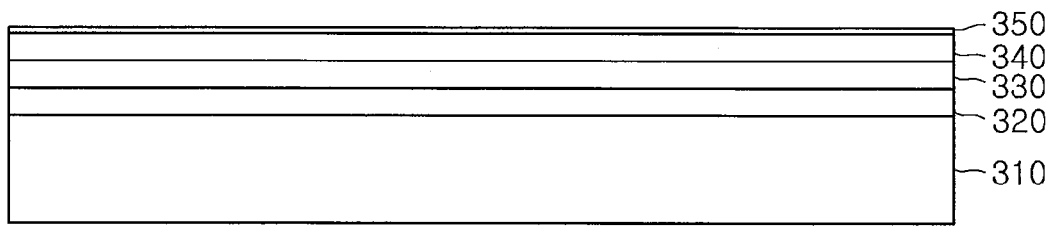

Referring to FIGS. 13A and 13B, a conductive layer may be formed on the whole surface of the second insulating substrate 310 having the color filters 330. The conductive layer may be a transparent conductive layer that contains ITO or IZO and may be formed by using sputtering. As a result, the common electrode 350 may be formed on the whole surface of the second insulating substrate 310. A pattern may be formed on the common electrode 350 in a photolithography process by using a third mask. When the pattern (not shown) of the common electrode 350 is formed, a slit 351 may also be formed in a portion of the common electrode 350 corresponding to the cell-gap spacer CS1 of the lower substrate 200, so that the cell-gap spacer CS1 and the common electrode 350 do not electrically contact each other. Then, the lower substrate 200 and the upper substrate 300 may be adhered to each other to complete the liquid crystal display panel 100 according to the present embodiment.

Hereinafter, a touch screen-embedded LCD, which includes color filters and a black matrix on a lower substrate thereof, according to one or more exemplary embodiments of the present invention will be described in detail with reference to the attached drawings.

Figure 14:
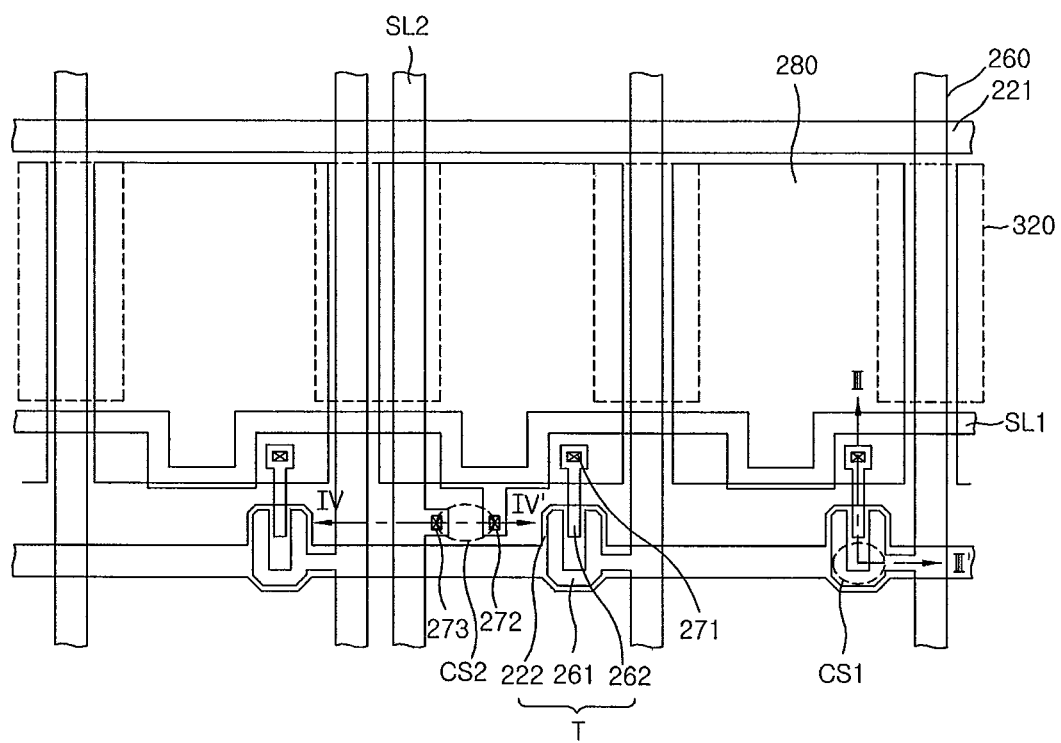
FIG. 14 is a schematic plan view of a touch screen-embedded liquid crystal display panel according to one or more exemplary embodiments of the present invention.
Figure 15:
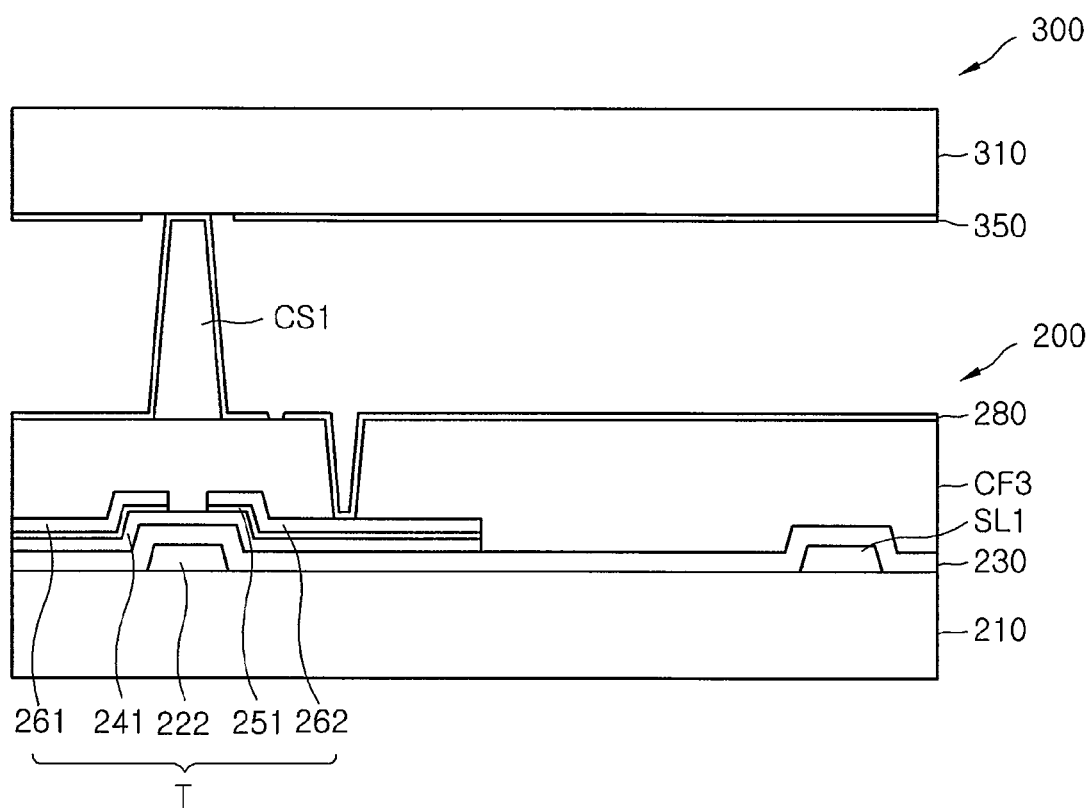
FIGS. 15 and 16 are cross sectional views of the touch screen-embedded liquid crystal display panel taken along lines III-III' and IV-IV' of FIG. 14 according to one or more exemplary embodiments of the present invention.
Figure 16:
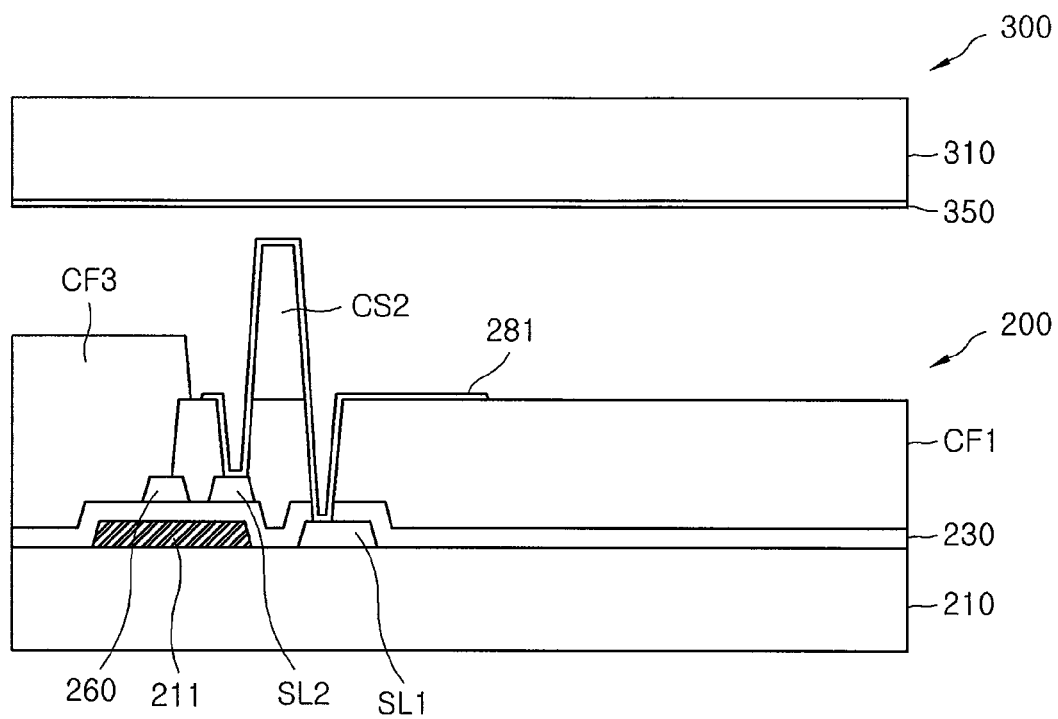

FIG. 14 is a schematic plan view of a touch screen-embedded liquid crystal display panel 100 according to one or more exemplary embodiments of the present invention. FIGS. 15 and 16 are cross sectional views of the touch screen-embedded liquid crystal display panel 100 taken along lines III-III' and IV-IV', respectively, of FIG. 14. As in the previous embodiments of FIG. 2 through 4, it will be assumed in the present embodiment that a sensing electrode and a conductive spacer are formed for every three pixels.

Referring to FIGS. 14 through 16, the touch screen-embedded liquid crystal display panel 100 according to the exemplary embodiment may include a lower substrate 200 and an upper substrate 300, which face each other, and a liquid crystal layer (not shown) which is interposed between the lower substrate 200 and the upper substrate 300.

The lower substrate 200 may include a black matrix 211, a plurality of gate lines 221, a plurality of data lines 260, a pixel electrode 280, and a TFT T on a first insulating substrate 210. The gate lines 221 may extend in a first direction, and the data lines 260 may extend in a second direction and may cross the gate lines 221. The pixel electrode 280 may be formed in a pixel region defined by the gate lines 221 and the data lines 260 and may be connected to a drain electrode 262 by a first contact hole 271. The TFT T may be connected to each of the gate lines 221, each of the data lines 260, and the pixel electrode 280.

The lower substrate 200 may further include first and second sensing lines SL1 and SL2, color filters, a cell-gap spacer CS1, a conductive spacer CS2, and a sensing electrode 281. The first sensing line SL1 may be separated from, and may extend in the same direction as, each of the gate lines 221. Similary, the second sensing line SL2 may be separated from, and may extend in the same direction as, each of the data lines 260. The color filters may be formed on the first and second sensing lines SL1 and SL2, and the cell-gap spacer CS1 and the conductive spacer CS2 may be formed on the color filters. The sensing electrode 281 may be formed on the conductive spacer CS2 and may be connected to the first and second sensing lines SL1 and SL2 by second and third contact holes 272 and 273, respectively. In addition, the upper substrate 300 may include a second insulating substrate 310 and a common electrode 350 which is formed on the second insulating substrate 310.

The color filters may include an R filter CF1, a G filter CF2 and a B filter CF3, and may be formed on a gate insulating film 230 which has on it the TFT T, the second sensing line SL2, and the data lines 260. The first contact hole 271, which may partially expose the drain electrode 262, and the second and third contact holes 272 and 273, which may partially expose the first and second sensing lines SL1 and SL2, respectively, may be formed in the color filters. Here, the pixel electrode 280 may be formed on the color filters and may be connected to the drain electrode 262 of the TFT T by the first contact hole 271. The pixel electrode 280 may be made of a transparent conductive material, such as ITO or IZO.

As described above, the color filters may include the R filter CF1, the G filter CF2, and the B filter CF3. In the present embodiment, each of the R filter CF1, the G filter CF2, and the B filter CF3 may have a different thickness. For example, the thickness of the R filter CF1 may be the smallest, that of the G filter CF2 may be the intermediate, and that of the B filter CF3 may be the greatest of the three color filters. However, embodiments of the present invention may not be limited thereto. While each color filter has a different thickness, its color may change.

Due to the difference between the thicknesses of the R filter CF1, the G filter CF2, and the B filter CF3, the cell-gap spacer CS1 and the conductive spacer CS2 may be formed to have an equal height, unlike in the previous exemplary embodiments of FIG. 2 through 4. That is, the cell-gap spacer CS1 may be formed on a thickest color filter, for example, the B filter CF3, and the conductive spacer CS2 may be formed on a color filter, for example, the R filter CF1, which does not have the cell-gap spacer CS1. Thus, the cell-gap spacer CS1 may contact the upper substrate 300, and the conductive spacer CS2 may not contact the upper substrate 300. Here, the difference in heights, or the gap, between the top of the cell-gap spacer CS1 and the top of the conductive spacer CS2 may be sufficient to enable the operation of a touch panel. For example, the gap may be 0.3 to 1.0 μm or 0.5 to 0.8 μm. However, embodiments of the present invention may not be limited thereto.

As described above, color filters may be formed on a lower substrate, and each of the color filters may have a different thickness so that a cell gap between the lower substrate 200 and the upper substrate 300 may be different in each region. The cell gap between the lower and upper substrates 200 and 300 may be a multi-cell gap. Accordingly, the cell-gap spacer CS1 and the conductive spacer CS2, which are formed on color filters of different colors, may have different heights. Here, a color filter on which the cell-gap spacer CS1 is formed must be thicker than a color filter on which the conductive spacer CS2 is formed.

In the present embodiment, color filters having different thicknesses and colors may be formed on a lower substrate 200, and a cell-gap spacer CS1 and a conductive spacer CS2 may be formed on the color filters having different thicknesses. Thus, the cell-gap spacer CS1 and the conductive spacer CS2 may be formed to have different heights without requiring an additional process.

FIGS. 17A through 23B are cross-sectional views of a device for sequentially explaining processes included in a method of manufacturing the lower substrate 200 of the touch screen-embedded LCD according to one or more exemplary embodiments of the present invention. 'A' of each drawing is a process cross-sectional view of the lower substrate 200 taken along the line III-III' of FIG. 14, and 'B' of each drawing is a process cross-sectional view of the lower substrate 200 taken along the line IV-IV' of FIG. 14.

Figure 17A:
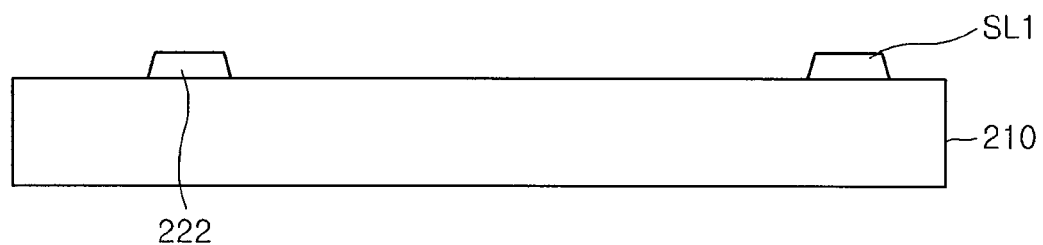
FIGS. 17A through 23B are cross-sectional views of a device for sequentially explaining processes included in a method of manufacturing a lower substrate of the touch screen-embedded LCD taken along lines III-III' and IV-IV' of FIG. 14 according to one or more exemplary embodiments of the present invention.
Figure 17B:
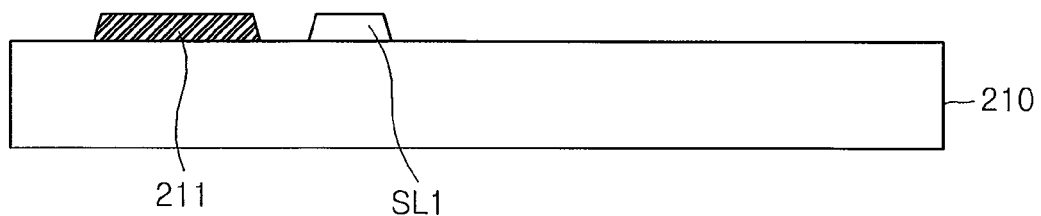

Referring to FIGS. 17A and 17B, a first conductive layer may be formed on a transparent insulating substrate, that is, the first insulating substrate 210, by chemical vapor deposition (CVD), physical vapor deposition (PVD), or sputtering. The first conductive layer may be made of at least one of Cr, MoW, Cr/Al, Cu, Al(Nd), Mo/Al, Mo/Al(Nd), or Cr/Al(Nd). The first conductive layer may be multiple layers. Then, a photosensitive film may be formed on the first conductive layer, and a photolithography process may be performed on the photosensitive film by using a first mask (not shown) to form a first photosensitive film mask pattern (not shown). Next, an etch process may be performed by using the first photosensitive film mask pattern as an etch mask to form each of the gate lines 221, the gate electrode 222 protruding from the gate lines 221, the first sensing line SL1, and the black matrix 211. Then, a strip process may be performed to remove the first photosensitive film mask pattern.

Figure 18A:
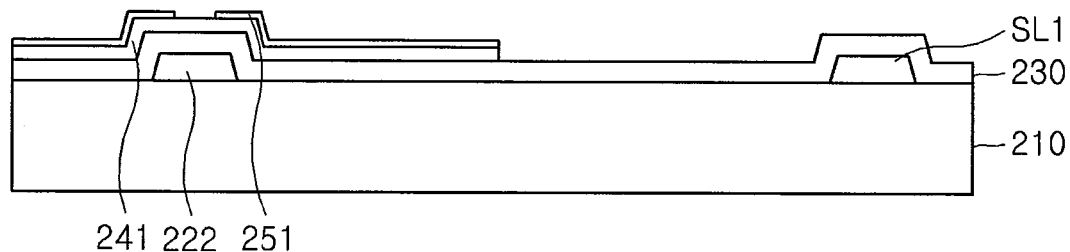
Figure 18B:
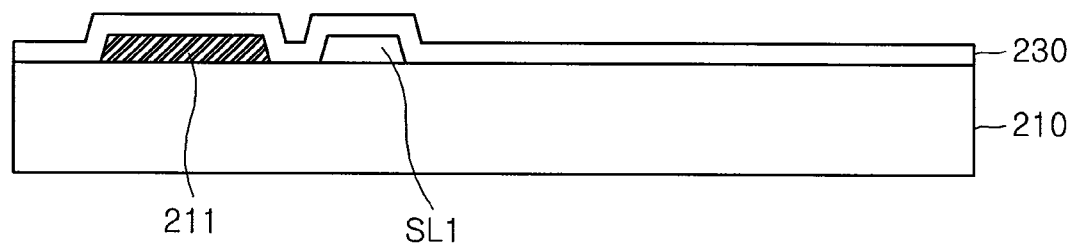

Referring to FIGS. 18A and 18B, the gate insulating film 230, an active layer 241, and an ohmic contact layer 251 may be sequentially formed on the first insulating substrate 210. Then, an etch process may be performed by using a second photosensitive film mask pattern (not shown) to form an active region of each TFT T.

Specifically, the gate insulating film 230 may be formed on the first insulating substrate 210 by plasma-enhanced chemical vapor deposition (PECVD) or sputtering. Here, the gate insulating film 230 may be made of an inorganic insulating material which contains $SiO_x$ or $SiN_x$. The active layer 241 and the ohmic contact layer 251 may be sequentially formed on the gate insulating film 230 by using one of the deposition methods such as CVD, PVD, or sputtering described above. An amorphous silicon layer may be used as the active layer 241, and a silicide layer or an n+ hydrogenated amorphous silicon layer doped with n-type impurities in high concentration may be used as the ohmic contact layer 251.

Next, a photosensitive film may be coated on the ohmic contact layer 251, and a photolithography process may be performed by using a second mask (not shown) to form the second photosensitive film mask pattern (not shown). Next, an etch process may be performed by using the second photosensitive film mask pattern as an etch mask and using the gate insulating film 230 as an etch-stop film in order to remove the ohmic contact layer 251 and the active layer 241. As a result, an active region having a predetermined shape may be formed on the gate electrode 222. Then, a strip process may be performed to remove the remaining second photosensitive film mask pattern.

Figure 19A:
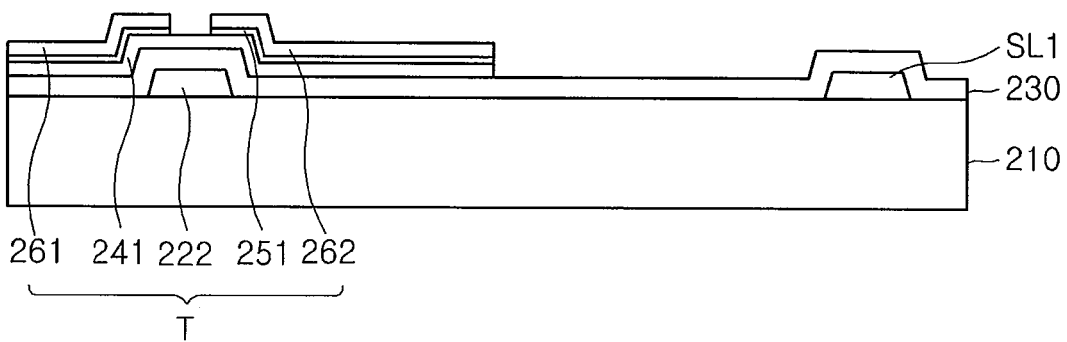
Figure 19B:
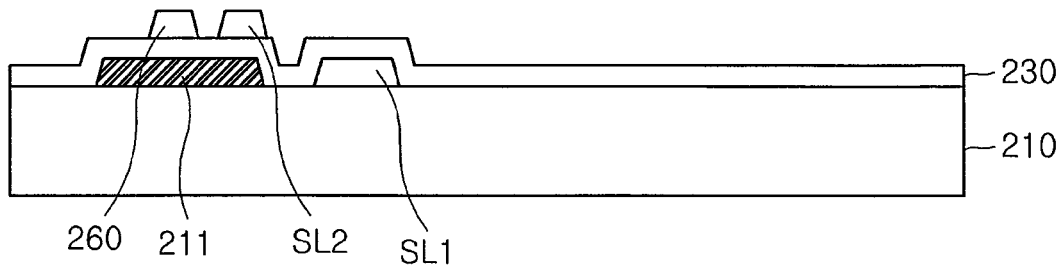

Referring to FIGS. 19A and 19B, a second conductive layer may be formed on the whole surface of the first insulating substrate 210 having the active region of each TFT T. Then, the second conductive layer may be etched using a third photosensitive film mask pattern (not shown) to form each of the data lines 260, the second sensing line SL2, the source electrode 261 protruding from the data line 260, and the drain electrode 262.

Specifically, the second conductive layer may be formed on the first insulating substrate 210 by CVD, PVD or sputtering. A single layer or multiple layers made of at least one of Mo, Al, Cr or Ti may be used as the second conductive layer. Alternatively, the second conductive layer may be made of a material identical to that of the first conductive layer. After a photosensitive film is coated on the second conductive layer, a photolithography process may be performed by using a mask to form the third photosensitive film mask pattern. Then, the second conductive layer may be etched by using the third photosensitive film mask pattern as an etch mask. Next, the third photosensitive film mask pattern may be removed, and an etch process may be performed using the etched second conductive layer as an etch mask. As a result, a portion of the ohmic contact layer 251 exposed by the second conductive layer may be removed, and a channel, which is the active layer 241, may be formed between the source electrode 261 and the drain electrode 262.

Figure 20A:
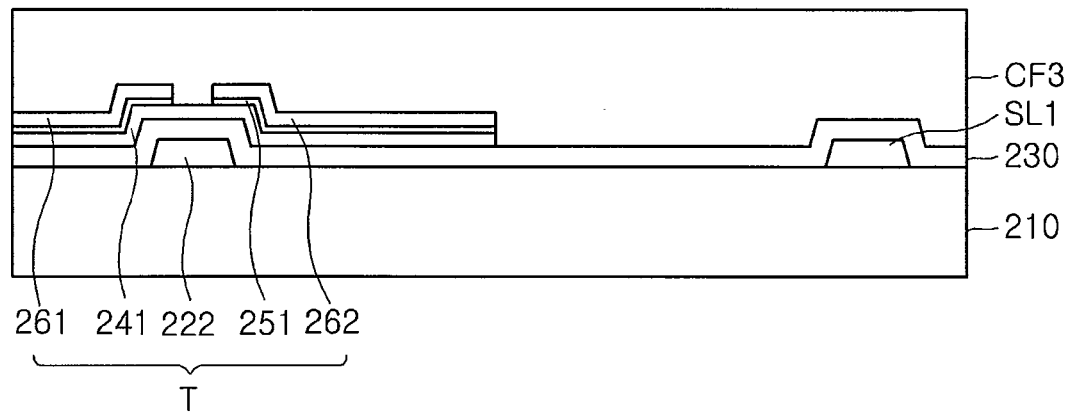
Figure 20B:
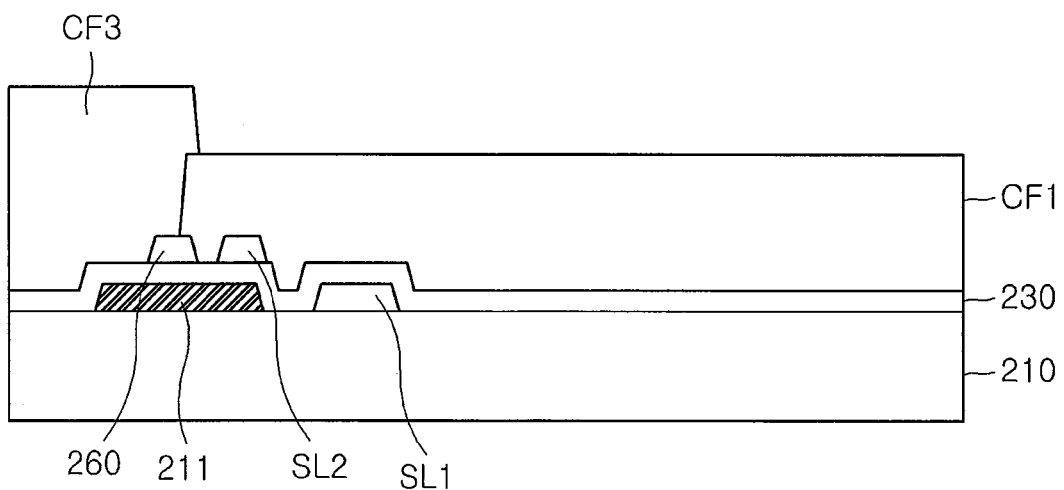

Referring to FIGS. 20A and 20B, the color filters including the R filter CF1, the G filter CF2 and the B filter CF3 may be formed on the whole surface of the first insulating substrate 210 having the TFT T and the data lines 260. Here, each of the R filter CF1, the G filter CF2 and the B filter CF3 may be formed to have a different thickness. For example, the thickness of the R filter CF1 may be the smallest, the thickness of the G filter CF2 may be the intermediate, and the thickness of the B filter CF3 may be the greatest of the three color filters.

Figure 21A:
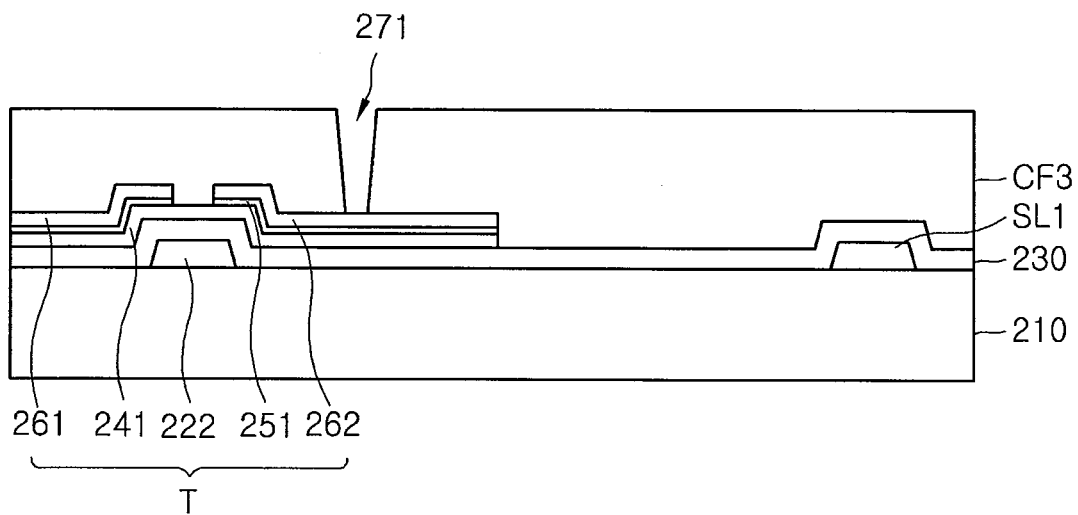
Figure 21B:
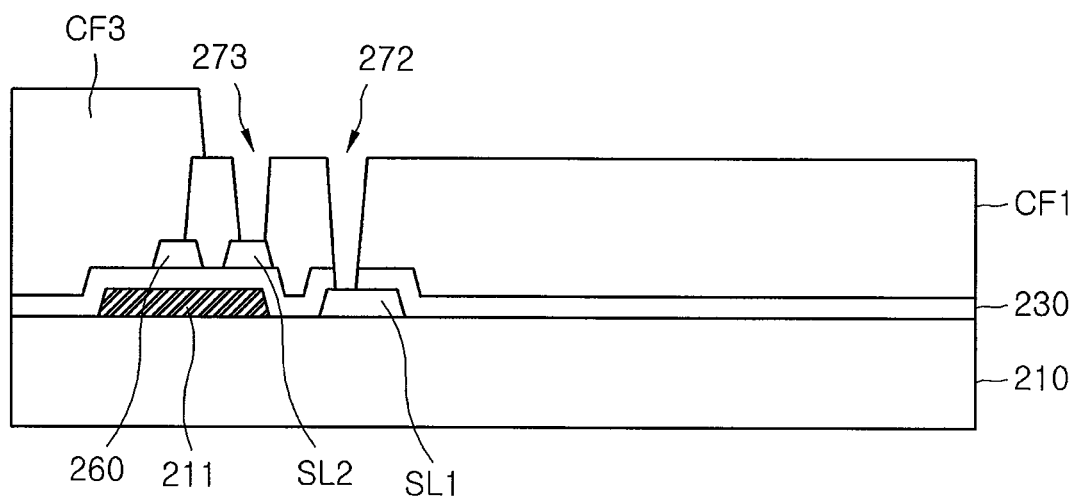
Figure 22A:
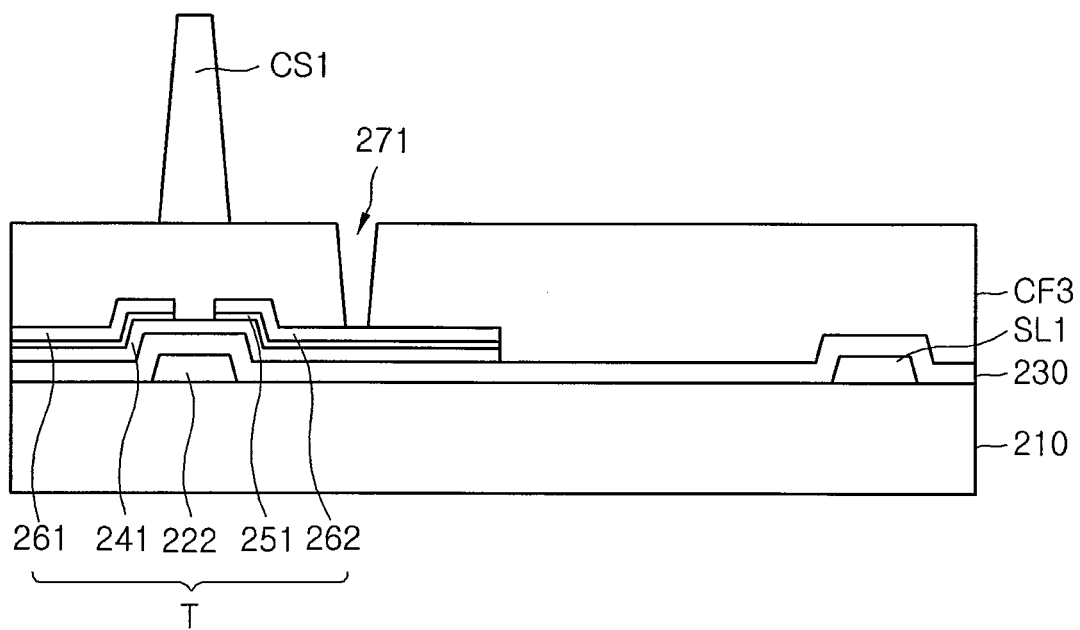
Figure 22B:
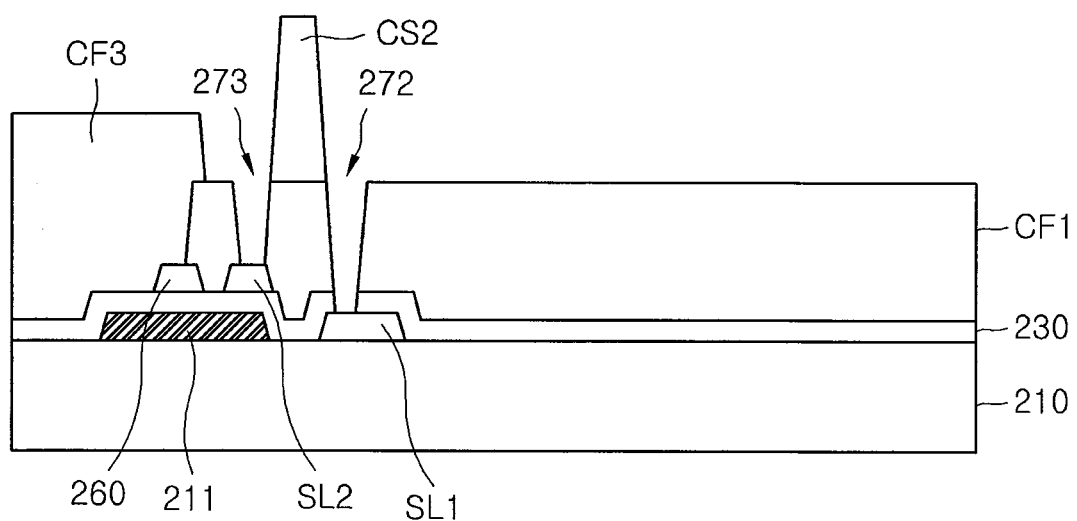

Referring to FIGS. 21A and 21B, an etch process may be performed using a fourth photosensitive film mask pattern to partially remove the color filter. As a result, the first through third contact holes 271 through 273 may be formed Referring to FIGS. 22A and 22B, a third conductive layer may be formed on the whole surface of the color filters. Then, the third conductive layer may be patterned using a fifth photosensitive film mask pattern (not shown) to form the cell-gap spacer CS1 and the conductive spacer CS2. The cell-gap spacer CS1 may be formed on the TFT T, and the conductive spacer CS2 may be formed on the first and second sensing lines SL1 and SL2.

Figure 23A:
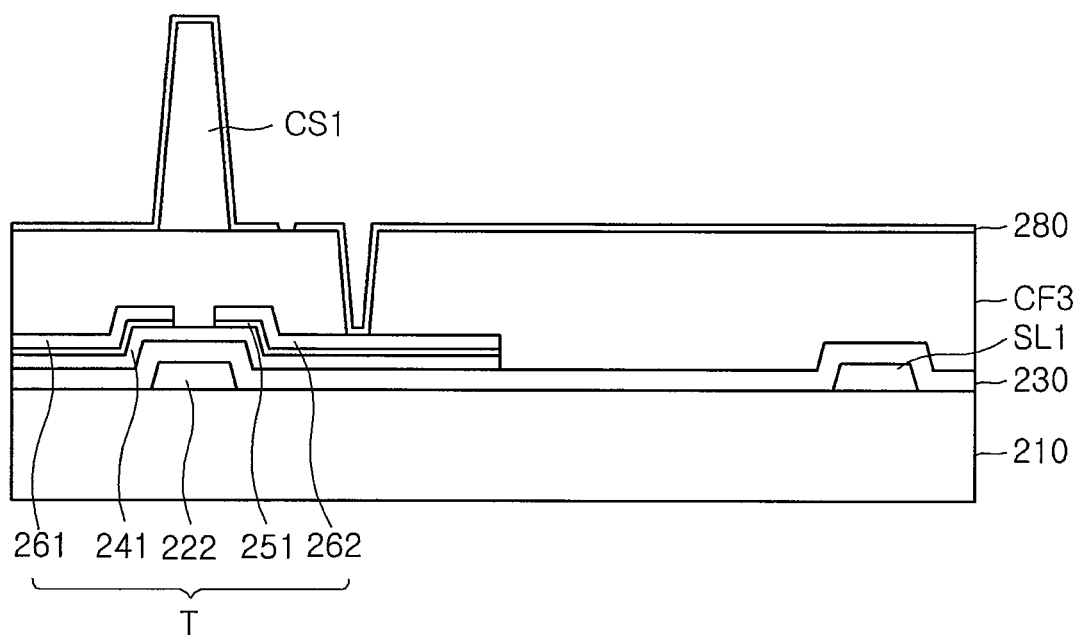
Figure 23B:
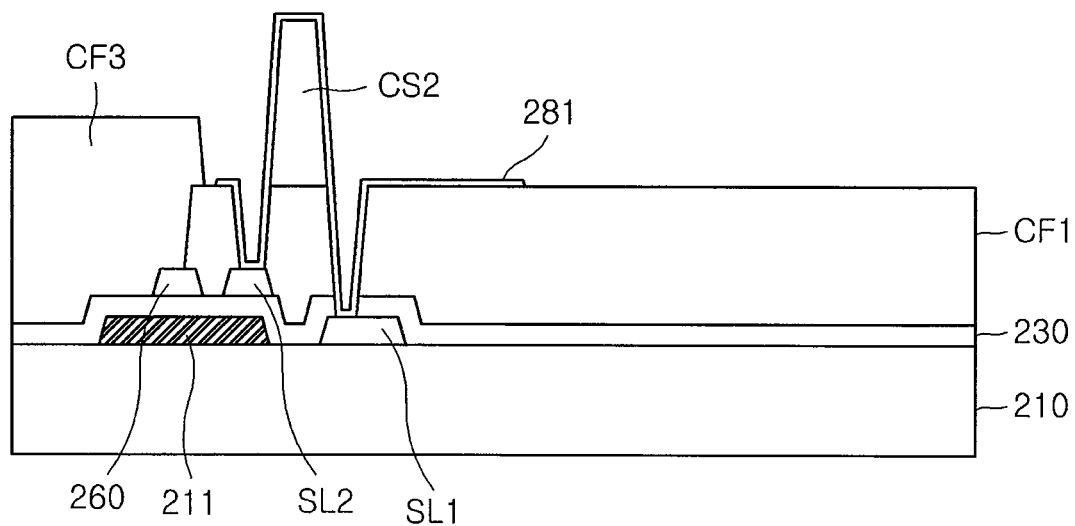

Referring to FIGS. 23A and 23B, a fourth conductive layer may be formed on the color filter, the cell-gap spacer CS1 and the conductive spacer CS2. Then, the fourth conductive layer may be patterned using a sixth photosensitive film mask pattern (not shown) to form the pixel electrode 280 and the sensing electrode 281. The pixel electrode 280 may be connected to the drain electrode 262 by the first contact hole 271, and the sensing electrode 281 may be connected to the first and second sensing lines SL1 and SL2 by the second and third contact holes 272 and 273, respectively. The fourth conductive layer may be a transparent conductive layer made of ITO or IZO.

FIGS. 24A through 25B are cross-sectional views of a device for sequentially explaining processes included in a method of manufacturing the upper substrate 300 of the touch screen-embedded LCD according to one or more exemplary embodiments of the present invention. 'A' of each drawing is a process cross-sectional view of the upper substrate 300 taken along the line III-III' of FIG. 14, and 'B' of each drawing is a process cross-sectional view of the upper substrate 300 taken along the line IV-IV' of FIG. 14.

Figure 24A:
FIGS. 24A through 25B are cross-sectional views of a device for sequentially explaining processes included in a method of manufacturing an upper substrate of the touch screen-embedded LCD taken along lines III-III' and IV-IV' of FIG. 14 according to one or more exemplary embodiments of the present invention.
Figure 24B:

Referring to FIGS. 24A and 24B, a first conductive layer, i.e., the common electrode 350, may be formed on a transparent insulating substrate, i.e., the second insulating substrate 310, which may be made of glass, quartz, ceramic or plastic. The first conductive layer may be a transparent conductive layer, which is made of ITO or IZO, and formed by CVD, PVD, or sputtering.

Figure 25A:
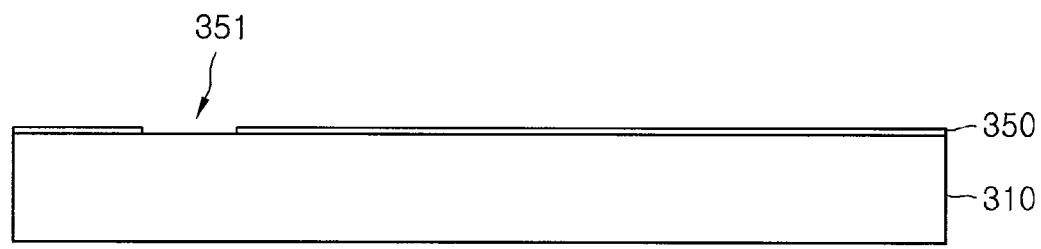
Figure 25B:

Referring to FIGS. 25A and 25B, a portion of the common electrode 350, corresponding to a region in which the cell-gap spacer CS1 of the lower substrate 200 is formed, may be removed in a photolithography process to form a slit 351 using a mask so that the cell-gap spacer CS1 does not electrically contact the common electrode 350. When the photolithography process is performed in the portion of the common electrode 350 corresponding to the region of the cell-gap spacer CS1, a pattern (not shown) may also be formed on the common electrode 350. Then, the lower substrate 200 and the upper substrate 300 may be adhered to each other to complete the liquid crystal display panel 100 according to the present embodiment.

The present invention may provide a touch screen-embedded liquid crystal display panel 100 including a cell-gap spacer CS1 and a conductive spacer CS2, and a method of manufacturing the touch screen-embedded liquid crystal display panel 100, where the cell-gap spacer CS1 and the conductive spacer CS2 may be simultaneously formed on the same layer to reduce the number of manufacturing processes and manufacturing costs In addition, the present invention may provide a touch screen-embedded liquid crystal panel 100 and a method of manufacturing the liquid crystal display panel 100, in which a cell-gap spacer CS1 and a conductive spacer CS2 may be formed on the same layer, and a portion of a common electrode 350 corresponding to a region where the cell-gap spacer CS1 is formed may be etched to form a slit pattern 351 so that an upper substrate 300 may be manufactured without requiring an additional process.

While exemplary embodiments of the present invention have been particularly shown and described, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:
1. A display panel comprising:
a transparent first substrate;
a second substrate which faces the first substrate;
a conductive spacer and a cell-gap spacer which are formed on the first substrate; and
a common electrode which is formed on the second substrate and has an aperture, wherein the cell-gap spacer contacts the second substrate through the aperture.
2. The display panel of claim 1, wherein the conductive spacer and the cell-gap spacer are formed on the same layer.

3. The display panel of claim 2, wherein the first substrate comprises a first structure on which the conductive spacer and the cell-gap spacer are formed.

4. The display panel of claim 3, wherein the second substrate comprises a second structure on which the common electrode is formed.

5. The display panel of claim 4, wherein the first structure comprises a thin-film transistor (TFT), first and second sensing lines, and an insulating film which is formed on the TFT and the first and second sensing lines.

6. The display panel of claim 5, wherein a sensing electrode is formed on the conductive spacer and is connected to the first and second sensing lines by contact holes which are formed in the insulating film.

7. The display panel of claim 5, wherein the second structure comprises a black matrix, color filters formed on the black matrix, and the common electrode formed on the color filters.

8. The display panel of claim 3, wherein the first structure comprises a TFT, first and second sensing lines, and color filters which are formed on the TFT and the first and second sensing lines.

9. The display panel of claim 8, wherein a sensing electrode is formed on the conductive spacer and is connected to the first and second sensing lines by contact holes which are formed in the color filters.

10. The display panel of claim 8, wherein the color filters comprise a red filter, a green filter, and a blue filter which have different thicknesses.

11. The display panel of claim 10, wherein the cell-gap spacer is formed on a thickest color filter from among the color filters, and the conductive spacer is formed on a color filter of a different color than the color filter on which the cell-gap spacer is formed.

* * * * *